United States Patent
Dailey et al.

(10) Patent No.: US 6,363,352 B1
(45) Date of Patent: Mar. 26, 2002

(54) AUTOMATIC SCHEDULING AND FORMATION OF A VIRTUAL MEETING OVER A COMPUTER NETWORK

(75) Inventors: Jane L. Dailey, Seattle, WA (US); Matthew D. Bookspan, Palo Alto, CA (US); Yoram Yaacovi, Redmond, WA (US); Steven M. Silverberg; Troy A. Hakala, both of Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/191,626

(22) Filed: Nov. 13, 1998

(51) Int. Cl.[7] ............................................... G06F 17/60
(52) U.S. Cl. ............................... 705/9; 705/8; 707/530
(58) Field of Search ............................... 705/1, 5, 6, 7, 705/8, 9; 345/330, 331, 332; 707/530, 531

(56) References Cited

U.S. PATENT DOCUMENTS

| | | | |
|---|---|---|---|
| 4,710,917 A | 12/1987 | Tompkins et al. | 709/204 |
| 5,751,958 A | 5/1998 | Zweben et al. | 709/204 |
| 5,896,128 A | 4/1999 | Boyer | 345/327 |
| 5,902,352 A | 5/1999 | Chou et al. | 709/102 |
| 5,907,324 A | 5/1999 | Larson et al. | 345/330 |
| 5,931,878 A | 8/1999 | Chapin, Jr. | |
| 6,016,478 A * | 1/2000 | Zhang et al. | |

FOREIGN PATENT DOCUMENTS

| | | | |
|---|---|---|---|
| EP | 574138 A1 * | 12/1993 | H04N/7/15 |
| EP | 1109121 A2 * | 6/2001 | G06F/17/60 |

OTHER PUBLICATIONS

Dabnor, "CTI improves videoconferencing," Telemarketing and Call Center Solutions, Jan. 1997, v15, n7, 3 pages.*
Deixler, "Annual PBX roundup: new switch sales take off as PBXs acquire great new features," Teleconnect, Sep. 1994, v12, n9, 6 pages.*
Snyder, "Mac groupware: a collabrative effort," LAN Magazine, Mar. 1994, v9, n3, 10 pages.*

* cited by examiner

Primary Examiner—Tariq R. Hafiz
Assistant Examiner—Marc Norman
(74) Attorney, Agent, or Firm—Christensen O'Connor Johnson Kindness PLLC

(57) ABSTRACT

A method and system for scheduling a virtual meeting and automatically making the required connections near the time the virtual meeting is scheduled to take place between a meeting host's computer and at least one meeting participant's computer. The virtual meeting is scheduled by sending a meeting request from the meeting host's computer over a communication network to each meeting participant's computer. The meeting request is stored on the meeting host's computer and on each meeting participant's computer that accepts the meeting request. A personal information manager component on the meeting host's computer and on each meeting participant's computer activates a virtual meeting utility component near the time of the virtual meeting based on the time and date of the virtual meeting contained in the virtual meeting request. The virtual meeting is hosted on the meeting host's computer and each meeting participant's computers joins the virtual meeting automatically using information contained in the virtual meeting request. If an electronic document is specified in the virtual meeting request for collaborative editing during the virtual meeting, the personal information manager component on the meeting host's computer activates a document editing application associated with the electronic document and loads the electronic document into the document editing application.

48 Claims, 15 Drawing Sheets

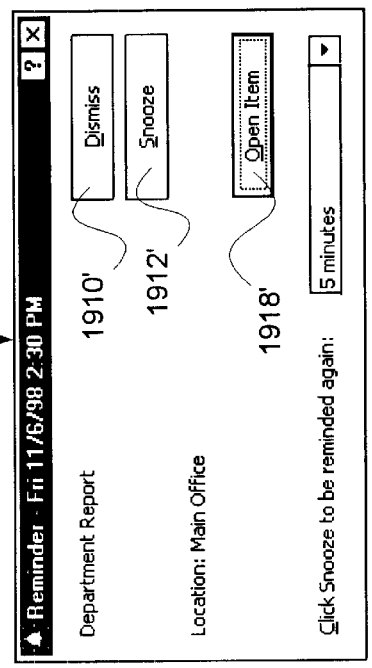
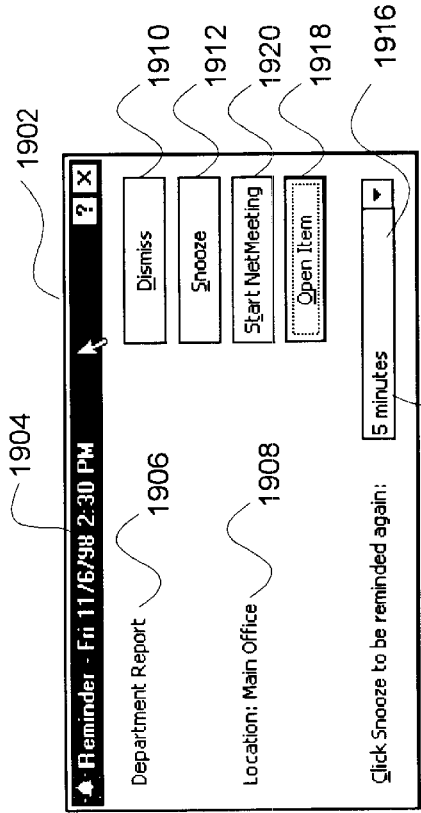
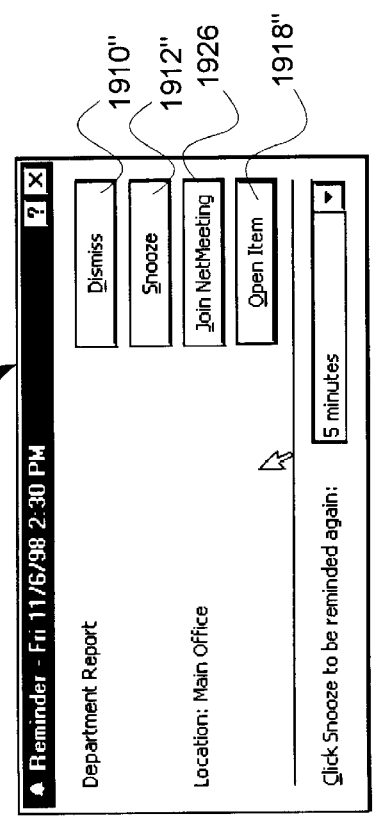

AUTOMATIC SCHEDULING AND FORMATION OF A VIRTUAL MEETING OVER A COMPUTER NETWORK

FIELD OF THE INVENTION

This invention relates generally to the scheduling and formation of meetings, and more particularly, to methods and systems for automatically scheduling and forming a virtual meeting between meeting attendees using a computer network.

BACKGROUND OF THE INVENTION

The growing complexity of the business environment has resulted in many business projects being assigned to workgroups rather than being produced by a single employee. The evolution of electronic data communications has removed the requirement that workgroups be limited to personnel that are physically proximate and has allowed workgroup membership to be based on the members' skills instead of their physical location. For instance, members of the workgroups may now be physically distributed between different cubicles or offices on the same floor, different floors in an office building, different office buildings on a corporate campus or different campuses located in the same or different regions of the country. Workgroups may also include workgroup members that travel or telecommute.

Business reports, financial spreadsheets and design schematics are examples of projects that may be created by a collaborative effort of a workgroup. These projects are increasingly being produced using application programs operating on a personal computer that edit a data file. The data file will be referred to below as an electronic document.

In the past, the collaborative editing of a document by workgroup members has been accomplished by printing a paper copy of the document and distributing the printed paper copy to each member of the workgroup for revision. One way to collaboratively edit the paper copy of the document has been to distribute a single paper copy sequentially from workgroup member to workgroup member so that the changes made by one workgroup member is incorporated into the document before subsequent changes are made. An alternative has been distribute a paper copy to each member of the work group so that each member independently makes changes to the document that later are consolidated into a single, final, document.

Connecting personal computers to communication networks has relieved the workgroup members from forwarding paper copies, but in many cases the collaboration process remains the same. Instead of forwarding a paper copy sequentially from workgroup member to workgroup member, an electronic document is forwarded as an electronic data file from workgroup member to workgroup member over a computer network, with each workgroup member editing the electronic document as it stands revised by a previous workgroup member and then sending it on to the next workgroup member. Alternatively, like the distribution of a paper copies to each workgroup member, a separate copy of the electronic document might be distributed electronically over a computer network as an electronic data file to all workgroup members simultaneously. The workgroup members revise their own copy of the electronic document and return it to a central workgroup member that is responsible for incorporating the various changes into a final document. To assist in these revision scenarios, some application programs provide tools for tracking changes made by various members of the workgroup. Examples revision tracking tools can be found in Microsoft Word 97, manufactured by Microsoft Corporation, Redmond, Wash.

Instead of requiring each member of the work group to individually edit a document , it is desirable to allow for the collaborative editing of an electronic document in real-time by the workgroup members. This can be accomplished by networking the computers of the workgroup members together to create a virtual meeting. In a virtual meeting, the computer systems of the members of a workgroup (or other attendees) are linked together electronically through a computer network with the ability to share a computer application to edit an electronic document.

While possible, in the past, sharing electronic documents for collaborative editing in a virtual meeting is a cumbersome manual process. Usually, a virtual meeting is organized on an "ad hoc" basis when a meeting host telephones one or more meeting participants and requests that they immediately join a virtual meeting. To enable the sharing of an electronic document, the meeting host must first start the document editing application and open the subject electronic document in that application. The meeting host then has to start the virtual meeting software and manually enable document sharing. The meeting participants have to manually start an instance of the virtual meeting on their computer, search for the meeting host on a directory server specified by the meeting host, and then manually instruct the virtual meeting software to join the virtual meeting using the meeting host's network address obtained from the directory server. When the meeting host again opens the document editing application, the meeting attendees are able to collaboratively edit the subject document in real-time.

While it is possible to schedule a virtual meeting manually using an appointment calendar of some type, most the time this is not a practical option. Scheduling a virtual meeting using a manual appointment calendar does not relieve the meeting host and the meeting participants from taking the manual steps described above to locate and join the meeting. For instance, the meeting host may send a meeting request to a group of meeting participants and the meeting request could be entered as an appointment that could signal reminders at the time of the meeting. However, this does not relieve the meeting host and the meeting attendees from the manual steps described above in order to establish the virtual meeting. Because the virtual meeting utility application has to be running on each of the meeting attendee's computers before the virtual meeting connection can be established over a communications network, at the time the virtual meeting is scheduled for, the meeting host has the option of telephoning the meeting participant's to remind each of them to start the virtual meeting application on their computer, or the meeting host may rely on the meeting applicant remembering, or being reminded by a personal information manager operating on their computer, that the virtual meeting is about to take place. The meeting host must also rely on the meeting attendees being able to manually join the virtual meeting by: starting the virtual meeting application, finding the network address of the meeting host and properly joining the meeting.

It would be desirable to provide a method and system for scheduling a virtual meeting between a meeting host and a meeting participant. It would also be desirable that the method and system automate the process of connecting the meeting host's computer and each meeting participant's computer together in a virtual meeting over a communication network at the scheduled time of the virtual meeting. A mechanism to automatically load an electronic document into its associated document editing application and to automatically make that electronic document available in the virtual meeting for collaborative editing by the meeting attendees would also be desirable. The present invention is directed to providing a method and system having one or more of these desirable attributes.

SUMMARY OF THE INVENTION

In accordance with the invention, a computer-implemented method and system for scheduling a virtual meeting between a meeting host and at least one meeting participant is provided. The virtual meeting is hosted on a meeting host's computer having a host virtual meeting utility and a host personal information manager application. A scheduled meeting request that includes the date and time of the meeting and the email address of the meeting host is sent over a communication network to at least one meeting participant's computer. Each meeting participant's computer also has a meeting participant virtual meeting utility and a meeting participant personal information manager application. The meeting participant's personal information manager application receives the scheduled meeting request, which the personal information manager stores until the date and time of the virtual meeting. At the time of the meeting on the scheduled date, the host personal information manager program invokes the host virtual meeting utility a predetermined time before the time and date of the virtual meeting as specified in the scheduled meeting request. The meeting participant's personal information manager application also invokes the meeting participant virtual meeting utility a predetermined time before the time and date of the virtual meeting that is specified in the scheduled meeting request. The predetermined time may be the same or different.

In accordance with another aspect of this invention, the virtual meeting utility is automatically instructed to host a virtual meeting at a scheduled date and time specified in a meeting request. The meeting participant's computers are automatically joined to the virtual meeting by obtaining a reference to a network address of the meeting host's computer based on the a meeting host's email address that is included as part of the meeting request that scheduled the meeting. The meeting host's email address is registered on a directory server together with an associated network address of the meeting host's computer. The meeting host's email address is read from the stored meeting request by the meeting participant's computer and the email address is sent to the directory server, which returns the network address of the meeting host's computer. The network address of the meeting host's computer is provided to the virtual meeting utility. Using email addresses to lookup network addresses is not required by the invention. Any unique identifier may be used as a key for looking up an associated network address using a directory server. It is also possible to specify the actual network address of the meeting host in the meeting request. Where a direct reference to the meeting participant's computer is provided, a directory server to lookup a meeting host's network addresses is not required. The virtual meeting utility uses the network address to create the connection between the meeting participant's computer and the meeting host's computer.

In accordance with still further aspects of this invention, an electronic document is specified in the meeting request as a meeting topic for the virtual meeting. At or near the time of the virtual meeting, the path and document name of the electronic document is read from a meeting request stored by a host's personal information manager. Using this path and document name, the electronic document is automatically opened in a document editing application that is associated with the electronic document on the meeting host's computer. If enabled by the meeting host in the virtual meeting, the electronic document may be collaboratively edited by the meeting host and each meeting participant in real time. Each meeting participant's computer receives a virtual image of the document editing application and the electronic document as they appear on the meeting host's computer. The meeting participants may edit the electronic document (including using the functions of the electronic document editing application) just as the meeting host is able to do on the meeting host's computer, all in real time. In addition to the collaborative editing of the document, the meeting host and the meeting participants may also communicate during the virtual meeting by audio, video or text messages.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIGS. 10A–10C are pictorial representation of meeting reminders displayed by the meeting host's computer and each meeting participant's computer a predetermined period of time before the virtual meeting is scheduled to take place, in accordance with the present invention.

DETAILED DESCRIPTION OF THE PREFERRED EMBODIMENTS

The present invention is directed to a computer implementable method and system for scheduling a virtual meeting between a meeting host and at least one meeting participant. A virtual meeting is conducted using computers connected together via a communication network such as the Internet. In accordance with the present invention, the virtual meeting is scheduled by way of a meeting request sent as an email message from a meeting host's computer to each meeting participant's computer. The meeting request includes the date and time of the virtual meeting and the email address of the meeting host. The meeting request is stored by the meeting host's computer and each meeting participant's computer. Near the date and time specified in the meeting request, a meeting reminder can be displayed on the meeting host's computer and each meeting participant's computer. With the meeting reminder, the present invention starts a virtual meeting utility on the meeting host's computer, enabling the meeting host's computer to host the scheduled virtual meeting. If an electronic document is specified in the meeting request, the electronic document is opened on the meeting host's computer in an associated electronic document editing application.

A meeting reminder can also be generated on each meeting participant's computer near the time of the scheduled virtual meeting. When the meeting reminder is displayed, an instance of the virtual meeting utility is automatically activated on that meeting participant's computer. It is also possible to automatically activate the virtual meeting utility without displaying a meeting reminder or by automatically instructing the reminder to start the virtual meeting utility and then to automatically close the reminder. By automatically discovering the network address of the meeting host's computer, which is based on the email address of the meeting host stored in the meeting reminder on the meeting participant's computer, the virtual meeting utility connects the meeting participant's computer across the communications network to the virtual meeting being hosted at the meeting host's computer.

During a virtual meeting, the meeting host and the meeting participants may communicate with each other via audio, video and text. A virtual meeting may also permit the meeting participants to share a computer application operating on the meeting host's computer, i.e., operate the computer application running on the meeting host's computer from each meeting participant's computer. For instance, the meeting host and each of the meeting participants can collaboratively edit the electronic document during the virtual meeting from their own computers using the computer application being shared by the meeting host's computer.

Exemplary Computer System and Network

Figure 1:
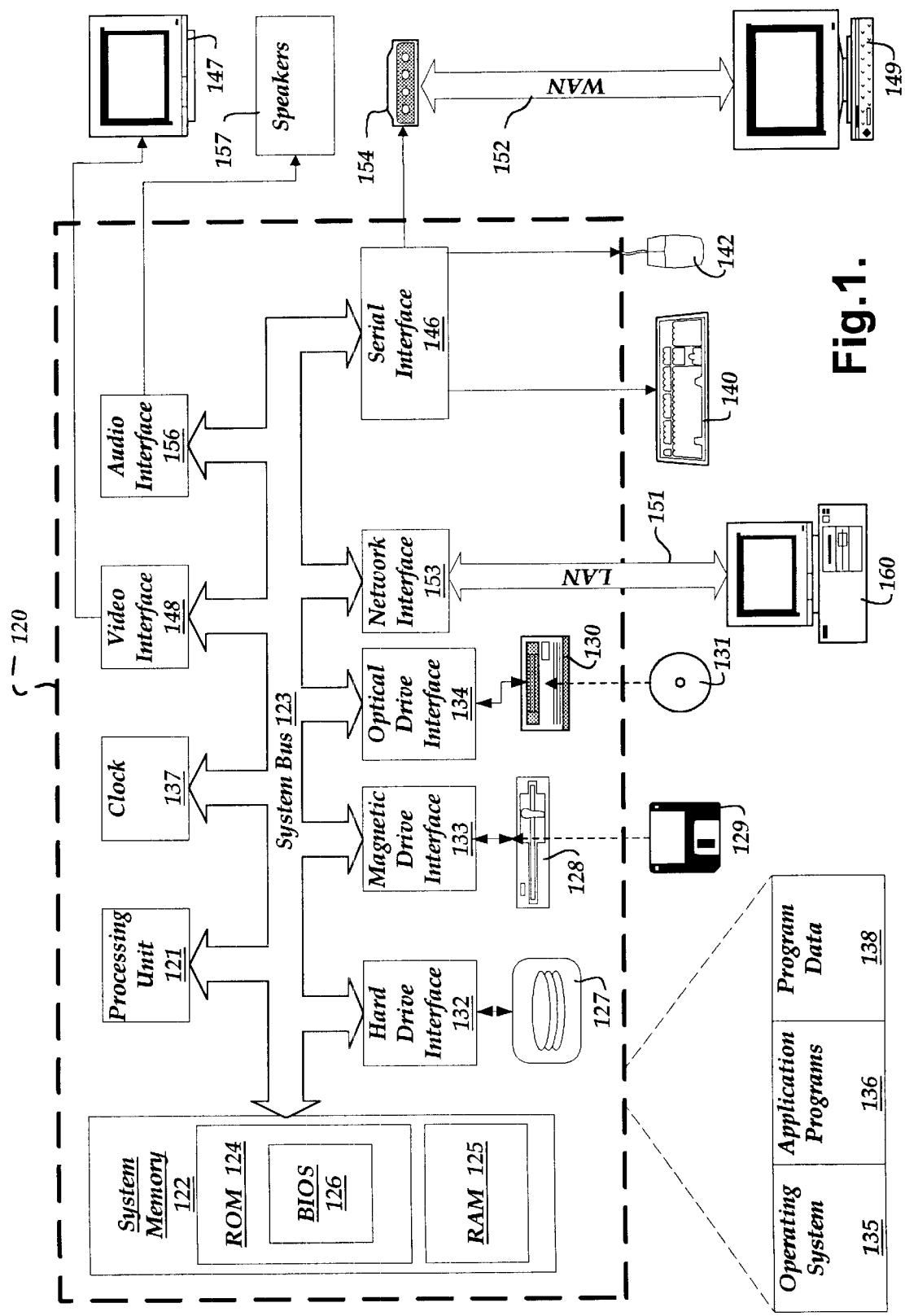
FIG. 1 is block diagram of a general-purpose computer system suitable for implementing the present invention.

FIG. 1 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network Process, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 120, including a processing unit 121, a system memory 122, and a system bus 123 that couples various system components including the system memory to the processing unit 121. The system bus 123 may be any one of several types of bus structures including a memory bus or memory controller, a peripheral bus, and a local bus using any of a variety of bus architectures. The system memory includes read only memory (ROM) 124 and random access memory (RAM) 125. A basic input/output system 126 (BIOS), containing the basic routines that helps to transfer information between elements within the personal computer 120, such as during startup, is stored in ROM 124. The personal computer 120 further includes a hard disk drive 127 for reading from and writing to a hard disk, not shown, a magnetic disk drive 128 for reading from or writing to a removable magnetic disk 129, and an optical disk drive 130 for reading from or writing to a removable optical disk 131 such as a CD ROM or other optical media. The hard disk drive 127, magnetic disk drive 128, and optical disk drive 130 are connected to the system bus 123 by a hard disk drive interface 132, a magnetic disk drive interface 133, and an optical drive interface 134, respectively. The drives and their associated computer-readable media provide nonvolatile storage of computer readable instructions, data structures, program modules and other data for the personal computer 120. Although the exemplary environment described herein employs a hard disk, a removable magnetic disk 129 and a removable optical disk 131, it should be appreciated by those skilled in the art that other types of computer-readable media which can store data that is accessible by a computer, such as magnetic cassettes, flash memory cards, digital versatile disks, Bernoulli cartridges, random access memories (RAMs), read only memories (ROM), and the like, may also be used in the exemplary operating environment.

A number of program modules may be stored on the hard disk drive 127, magnetic disk drive 128, optical disk drive 130, ROM 124 or RAM 25, including an operating system 135, one or more application programs 136, other program modules, and program data 138. A user may enter commands and information into the personal computer 120 through input devices such as a keyboard 140 and pointing device 142. Other input devices (not shown) may include a microphone, joystick, game pad, satellite dish, scanner, or the like. These and other input devices are often connected to the processing unit 121 through a serial port interface 146 that is coupled to the system bus, but may be connected by other interfaces, such as a parallel port, game port or a universal serial bus (USB). A monitor 147 or other type of display device is also connected to the system bus 123 via an interface, such as a video interface 148. One or more speakers 157 are also connected to the system bus 123 via an interface, such as an audio interface 156. In addition to the monitor and speakers, personal computers typically include other peripheral output devices (not shown), such as printers.

The personal computer 120 may operate in a networked environment using logical connections to one or more remote computers, such as remote computers 149 and 160. Each remote computer 149 or 160 may be another personal computer, a server, a router, a network PC, a peer device or other common network node, and typically includes many or all of the elements described above relative to the personal computer 120. The logical connections depicted in FIG. 1 include a local area network (LAN) 151 and a wide area network (WAN) 152. Such networking environments are commonplace in offices, enterprise-wide computer networks, intranets and the Internet. As depicted in FIG. 1, the remote computer 160 communicates with the personal computer 120 via the local area network 151. The remote computer 149 communicates with the personal computer 120 via the wide area network 152.

When used in a LAN networking environment, the personal computer 120 is connected to the local network 151 through a network interface or adapter 153. When used in a WAN networking environment, the personal computer 120 typically includes a modem 154 or other means for establishing communications over the wide area network 152, such as the Internet. The modem 154, which may be internal or external, is connected to the system bus 123 via the serial port interface 146. In a networked environment, program modules depicted relative to the personal computer 120, or portions thereof, may be stored in the remote memory storage device. It will be appreciated that the network connections shown are exemplary and other means of establishing a communications link between the computers may be used.

System Architecture

Figure 2A:
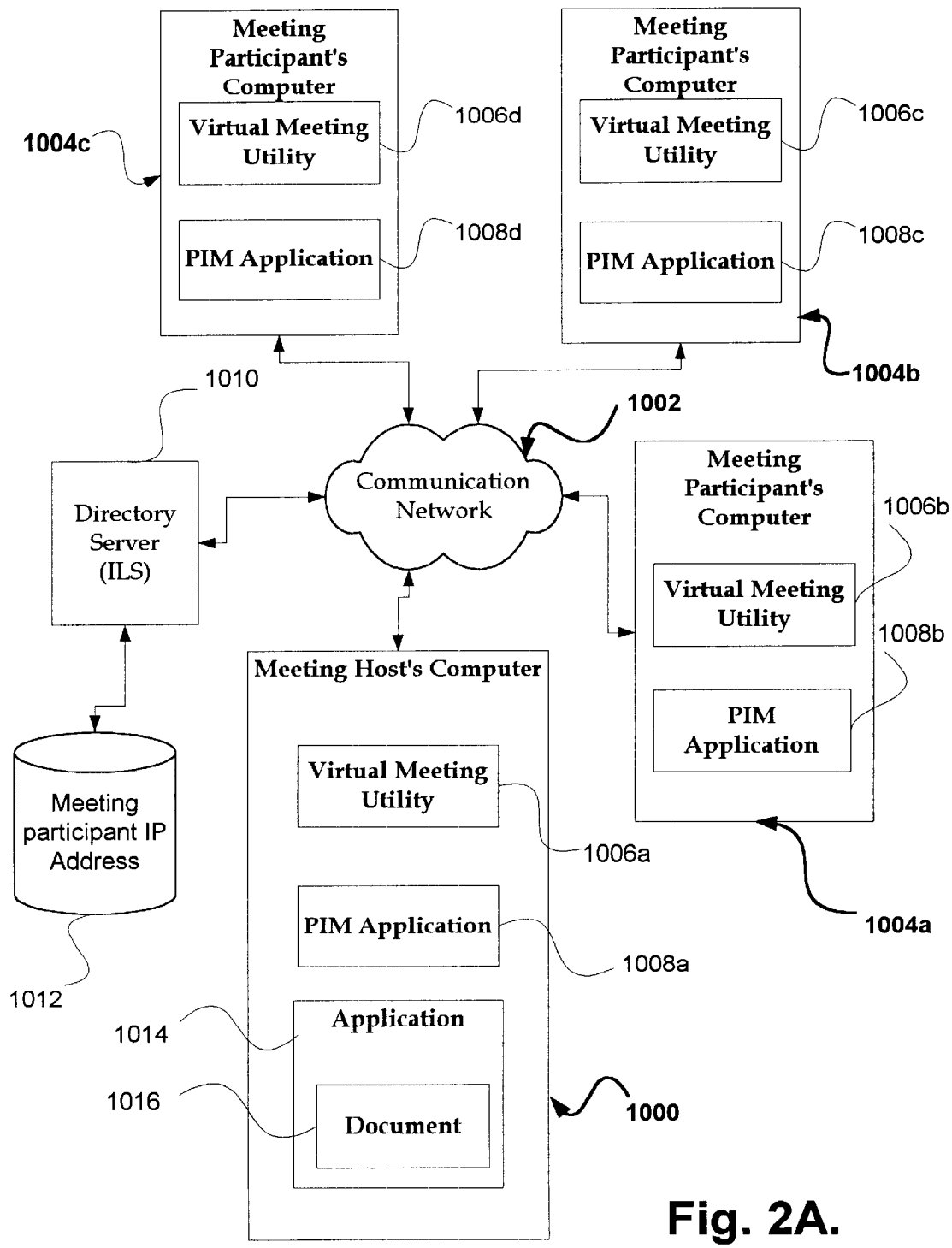
FIG. 2A is a block diagram illustrating the primary hardware and software components utilized by the present invention to schedule and connect a virtual meeting.

As illustrated in FIG. 2A, a virtual meeting involves a meeting host's computer 1000 communicating through a communication network 1002 with one or more meeting participant's computers 1004a–c. The meeting attendee's computers 1000 and 1004a–c may include the personal computer 120 described with reference to FIG. 1, or may be equivalent devices such as workstations, laptop computers, notebook computers, palmtop computers, personal digital assistance (PDAs), cellular telephones and alphanumeric pagers. The communications network 1002 may comprise a local area network (LAN) 151, a wide area network (WAN) 152, a telephone line and modem 154, a cable, or any other bi-directional communication means known to those skilled in the art.

During the virtual meeting, the communication functions are administered by a virtual meeting utility 1006a–d, a copy of which is loaded on the meeting host's computer 1000 and on each of the meeting participant's computers 1004a–c. In an actual embodiment of the invention, the virtual meeting utility 1006a–d is Microsoft NetMeeting, manufactured by Microsoft Corporation, Redmond, Wash. Microsoft NetMeeting is compliant with the International Telecommunications Union Teleconferencing Standard T.120. The T.120 protocol defines a standard for the multipoint delivery of teleconferencing data to multiple parties in real time. The technical details of the T.120 standard can be obtained from the International Telecommunications Union in Geneva, Switzerland, or through the ITU web page at http://www.itu.ch. Other telecommunications protocols may be used as developed or improved.

The meeting host's computer 1000 and each of the meeting participant's computers 1004a–c also have loaded on them a personal information manager (PIM) application 1008a–d. In an actual embodiment of the invention, the PIM application is Microsoft Outlook, available from Microsoft Corporation, Redmond, Wash. A personal information manager (PIM) is a computer application that stores and organizes unrelated information, such as notes, appointments, names, e-mail addresses, physical addresses and telephone numbers. Personal information managers have made it possible to coordinate meetings by enabling the meeting host to check the availability of conference rooms and meeting attendees, to send invitations to a group of meeting participants, to receive an acceptance or refusal of a meeting invitation from the meeting invitees, and to provide a reminder for the meeting a set amount of time before the meeting is to occur.

Figure 3:
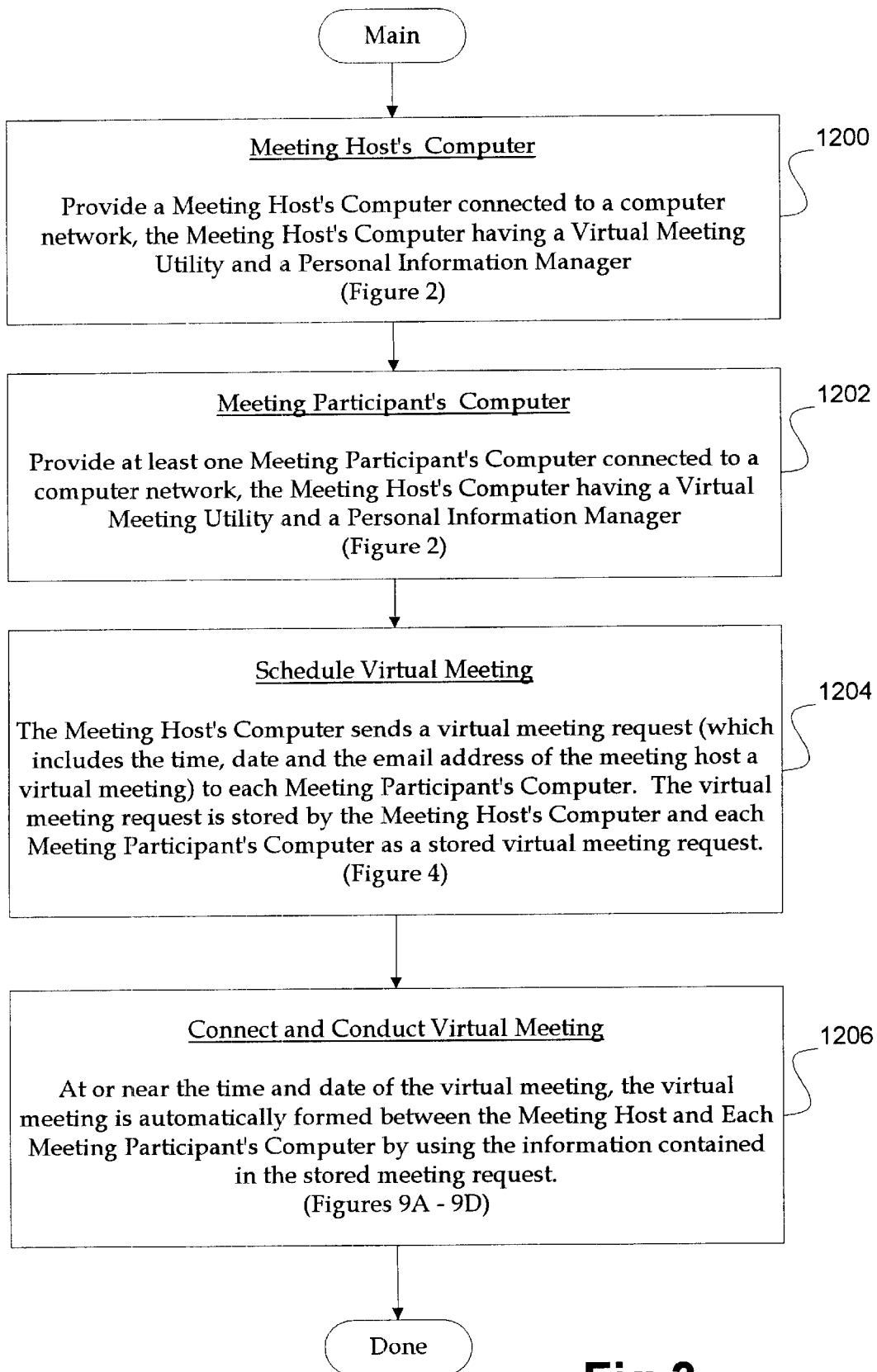
FIG. 3 is a functional flow diagram illustrating a broad overview of the method and system of the present invention.

As described in detail below, the virtual meeting utility utilizes a directory server 1010 that is accessible through the communication network 1002. The directory server 1010 is also known as an Internet location server (ILS). The directory server 1010 is coupled to a database 1012 that contains a list of IP addresses including the meeting host's computer 1000 and each of the meeting participant's computers 1004a–c. The IP address is associated with an email address for the meeting attendee (host or participant) that uses the meeting host's computer 1000 and for each of the meeting participant's computers 1004a–c. Network addressing using IP addresses is discussed below with reference to FIG. 3.

The meeting host's computer 1000 also has one or more document editing applications 1014. Each document editing application 1014 may access and edit one or more electronic documents 1016. For use in the present invention, the document editing application 1014 must interface with the virtual meeting utility 1006a, so that the electronic document 1016 may be collaboratively edited, i.e., allowing all meeting attendees to use the functionality of the document editing application 1014 through the interconnection of the meeting host's computer 1000 and each of the meeting participant's computers 1004a–c during a virtual meeting.

Figure 2B:
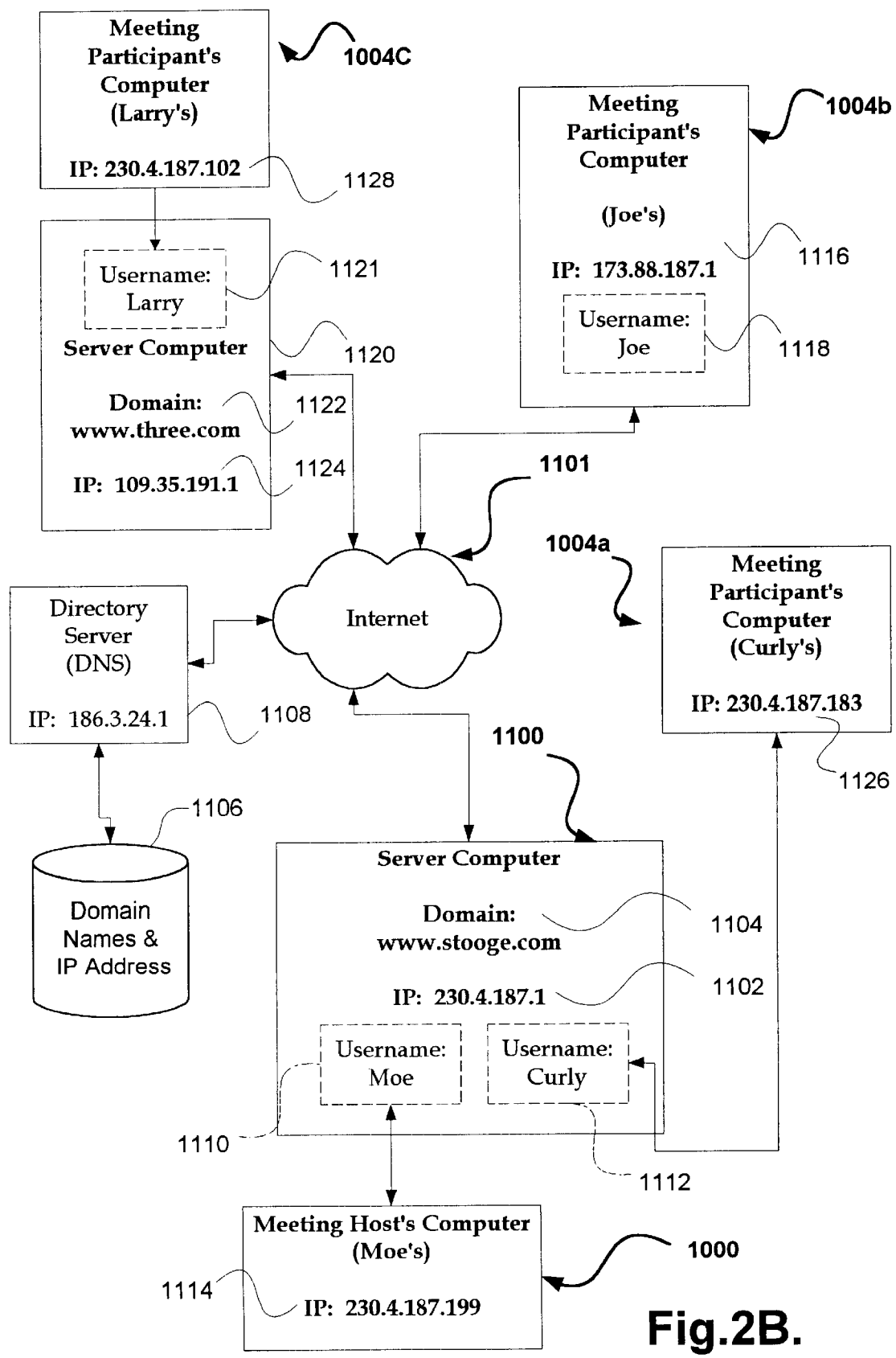
FIG. 2B is a block diagram illustrating the architecture of a network addressing system employed by the present invention.

Referring to FIG. 2B, the virtual meeting utility 1006a–d interconnects the meeting host's computer 1000 and the meeting participant's computers 1004a–c using the network address of each computer 1000 and 1004a–c. In an actual embodiment of the invention, the communication network 1002 is the Internet 1101. A brief discussion of network addressing on the Internet will assist with the discussion to follow. Basic communication on the Internet is controlled by the TCP/IP protocol. Each computer 1000 and 1004a–c connected to the Internet has a unique network address known as an Internet protocol address or "IP" address. At present, the IP address is a four byte numeric value expressed in a "dotted quad" format such as "204.57.237.199." Under the TCP/IP protocol, data files sent over the Internet to a destination computer are divided into one or more packets. The data packets are addressed to the destination computer using that computer's unique IP address and are individually routed to the destination IP address. Once the packets arrive at the destination computer they are reassembled into the complete data file.

While the numeric IP address is suited to the automated routing provided by the TCP/IP protocol, a numeric IP address is difficult for a computer operator to remember or specify when attempting to communicate with a user serviced by another computer attached to the Internet. To provide a human-friendly means to address other computers, computer domain names were developed as alphanumeric mnemonic that serve as aliases for the numeric IP addressees. The alphanumeric domain name must be registered with a central registration authority which associates the domain name with the IP address. The domain name and the associated IP address are then stored on directory servers (DNS) that are interspersed throughout the Internet and that automatically translate the domain name address into the numerical IP address. As mentioned above, the numeric IP address is used by the TCP/IP protocol to route the data packets to the requested domain. Each domain may identify one or more server computers. In turn, each server computer may have a number of users with each user having an associated username. By combining the username with the domain name, a specific user of a specific destination computer can be uniquely specified. For instance, the user "bill" at the domain "microsoft.com" would be addressed as "bill@microsoft.com", which is known as an email address.

In accordance with the invention, the architecture of a virtual meeting conducted on the Internet 1101 is illustrated in FIG. 2B. A server computer 1100 having an IP address 1102 of "230.4.187.1" is associated with a domain name 1104 of "www.stooge.com". The association of the IP address 1102 with the domain name 1104 is maintained in a distributed database 1106, which is accessible through a plurality of directory servers 1108 known on the Internet as Domain Name Service (DNS) servers.

Each server computer (e.g., server computer 1100) may serve a plurality of client computers, with the server assigning each client computer a unique IP address based on the IP address of the server computer. The server computer may recognize a plurality of usernames that access the server computer using a client computer attached to the server, also usually over the Internet. The server computer's recognition of the usernames is independent of the computer from which the user is accessing the server computer. For instance, username Moe 1110 may access server computer "www-.stooge.com" 1100 using the meeting host's computer 1000 (IP: 230.4.187.199) "Moe", a meeting participant's computer (IP: 230.4.187.183) or from any computer attached to the Internet (e.g., using Telnet).

While the email address of the user (e.g., "moe@stooge.com") is independent of the IP address of the server computer (e.g. server computer 1100; IP: 230.4.187.1), for the convenience of the discussion below, it will be assumed that username Moe 1110 always uses the meeting host's computer 1000, and usernames Curly 1112, Joe 1118 and Larry 1121, always use the meeting participant's computers 1004a–c, respectively.

In FIG. 2B, the meeting host's computer 1000 is connected to the server computer 1100, which assigns the meeting host's computer 1000 a subnet IP address 1114 "230.4.187.199". Similarly, the server computer 1100 assigns the IP address "230.4.187.183" to meeting participant's computer 1004a. It is also possible for a meeting participant's computer 1004b to be directly linked to the Internet and to have its own fixed IP address 1116, such as "173.88.187.1". The meeting participant's computer 1004b recognizes the username 1118 "Joe". All the meeting attendees in the virtual meeting do not have to be attached to the same server computer—and often are not. This is shown in FIG. 2B by the meeting participant's computer 1004c which is attached to a second server computer 1120 with the domain name 1122 of "three.com", which has been associated by registration with the IP address 1124 of "109.35.191.1".

If user Moe wishes to send a message to user Larry through the Internet, user Moe addresses the e-mail message to "larry@three.com". The e-mail message is forwarded from the meeting host's computer 1000 to the server computer 1100 and the server computer 1100 requests the IP address associated with the domain name 1122 "three.com" from the directory server 1108. The directory server 1108 retrieves the corresponding IP address 1124 ("109.35.191.1") for the domain name 1122 "three.com" from the distributed database 1106, addresses the one or more data packets comprising the email message to the IP address 1124 and forwards the data packets over the Internet 1101 to the server computer 1120. The email message is stored on the server computer 1120 until the username Larry accesses the server using a computer such as meeting participant's computer 1004c.

While it is convenient to uniquely identify the meeting attendees by way of their e-mail addresses, e.g., "larry@three.com", for real-time teleconferencing between the meeting host's computer 1000 and the meeting participant's computer, the virtual meeting utility 1006a–d (FIG. 2A) requires the IP addresses 1114, 1116, 1126, 1128 that are associated with the meeting host's computer 1000 and the meeting participant's computers 1004a, 1004b and 1004c, respectively. Since the domain name server (DNS) lookup of the email address would only resolve to the server computer's IP address (e.g., 1124), the virtual meeting utility 1006a–d is not provided the IP addresses 1114, 1116, 1126, 1128 from the DNS server that are necessary for sending data packets in real time directly to the meeting attendee's computers 1000, 1004 A–C.

To provide the actual IP address 1114, 1116, 1126, 1128 that is required by the virtual meeting utility 1006 A–D, the user's email address can be associated with the IP address of the actual computer in much the same way that a domain name is associated with an IP address in a DNS (FIG. 2B). In this context, the directory server 1010 is known as an ILS directory server 1010 (FIG. 2A). The ILS server 1010 maintains a database 1012 that associates the email address of a meeting attendee with the IP address at the computer that the meeting attendee is using. Each ILS server maintains its own database, so that a registration that appears in one ILS database 1012 may not necessarily appear in another ILS database. For instance, the meeting host's email address ("moe@stooges.com") is associated with the IP address 230.4.187.199, which is assigned to the meeting host's computer 1000. To find the IP address 1114 of the meeting host's computer 1000, the virtual meeting utility 1006b–d sends the email address of the meeting host to the ILS server 1010 through the Internet 1101. As mentioned above, it is important to know the domain name or IP address of the ILS server 1010 on which the email address of the meeting host has been registered, because each ILS server 1108 maintains its own database of registrations 1106. The IP address 1114 of the meeting host returned by the ILS server 1010 is used by the virtual meeting utility 1006b–d to address the teleconferencing information exchanged during the virtual meeting. The IP address of the meeting participant's computers 1004a–c is provided by the virtual meeting utility when the meeting participant's computer joins the virtual meeting. It is also possible to bypass the ILS server 1010 by providing the numeric IP address directly to the virtual meeting utility 1006b–d.

To create a virtual meeting using the virtual meeting utility 1006a–d independent of the invention, the virtual meeting utility 1006a on the meeting host's computer 1000 must be started and manually instructed to host a virtual meeting. The virtual meeting utility 1006b–d on the meeting participant's computers 1004a–c must also be started and instructed manually to join the virtual meeting being hosted on the meeting host's computer 1000. To join the meeting, a user on each meeting participant's computer must know the ILS server 1010 that the meeting host is listed on and then select the meeting host's email address from a list of registrations on the ILS server. As discussed in detail below, the present invention automates this cumbersome procedure and makes it nearly transparent to the user.

System Operation

The method and system of the present invention enables a virtual meeting to be scheduled at some time in the future and then, at the scheduled time of the meeting, automatically establish the virtual meeting. Referring to a broad overview of the present invention illustrated in FIG. 3, the meeting host is provided 1200 with a meeting host's computer 1000 that is connected to a computer network 1002 (FIG. 2). The meeting host's computer 1000 has a virtual meeting utility 1006a and a personal information manager 1008a.

Each meeting participant is provided 1202 (FIG. 3) with a meeting participant's computer 1004 A–C (FIG. 2) that has a virtual meeting utility 1006b–d and a personal information manager 1008b–d. The virtual meeting is scheduled 1204 when the meeting host's computer sends a virtual meeting request 1402 (FIG. 5) to each meeting participant's computer 1004a–c over the communications network 1202. Generally, the virtual meeting request 1402 will include the time and date of the meeting, together with the e-mail address of the meeting host. The virtual meeting request is stored by the personal information manager 1008a on the meeting host's computer 1000 and is also stored by the personal information manager 1008b–d on meeting participant's computer 1004a–c.

Figure 4:
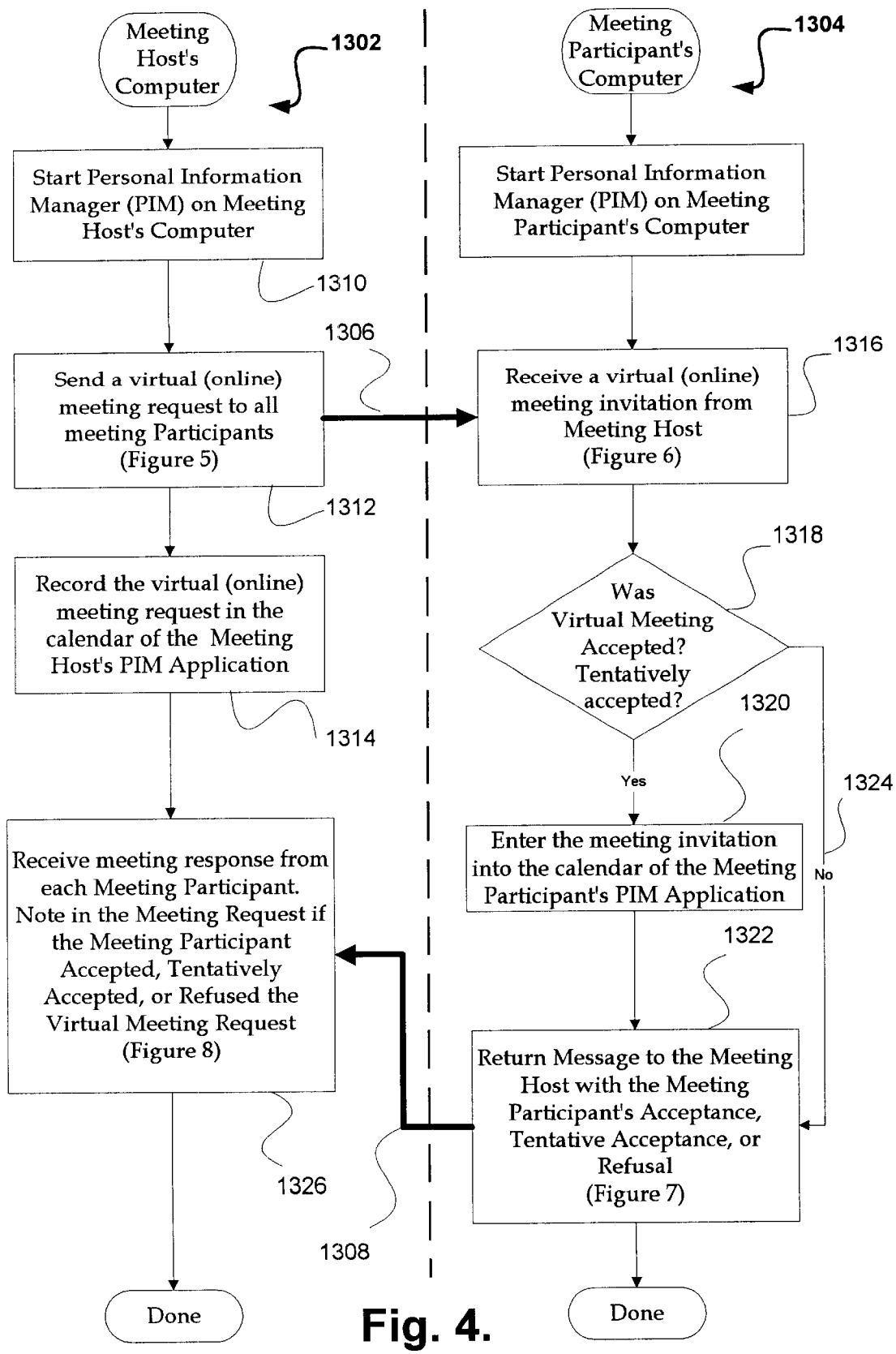
FIG. 4 illustrates with a pair of functional flow diagrams the process of the present invention performed on a meeting host's computer and the process performed on the meeting participants computer to schedule a virtual meeting, in accordance with the present invention.

The method and system of the present invention for scheduling a virtual meeting is illustrated by the twin processes 1302 and 1304, illustrated in FIG. 4. The meeting host process 1302 operates on the meeting host's computer 1000 while the meeting participant process 1304 operates on each of the meeting participant's computers 1004a–c. The meeting host process 1302 is depicted on the left side of FIG. 4 and the meeting participant process 1304 is depicted on the right side of FIG. 4. The bold arrows 1306 and 1308 indicate the interaction that occurs between the processes 1302 and 1304, the interaction usually conducted through e-mail messages transmitted over the communication network 1002.

Figure 5:
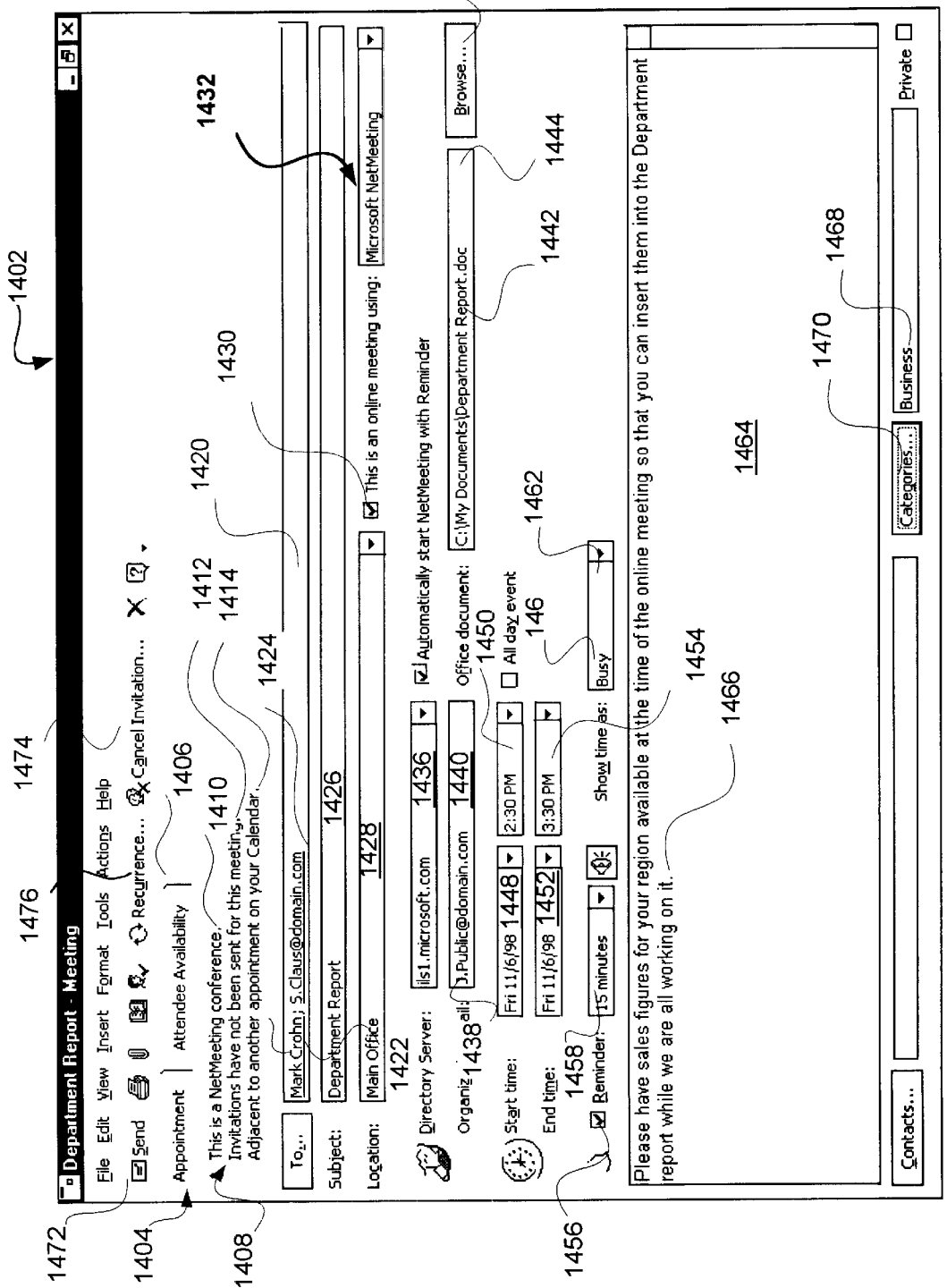
FIG. 5 is a pictorial representation of a meeting request on a meeting host's computer, in accordance with the present invention.

The meeting host process 1302 operating on the meeting host's computer 1000 begins by activating 1310 the personal information manager application 1008a on the meeting host's computer 1000. A virtual meeting request is then sent 1312 to all intended meeting participants. An exemplary meeting request 1402 is shown in FIG. 5. The meeting request 1402 has an "Appointment" tab 1404 that displays a view of the meeting request that is illustrated in FIG. 5. An alternate "Participant Availability" tab 1406 displays a view (not shown) that consolidates, if available, the meeting participants' appointment calendars as maintained by their personal information managers 1008b–d. The e-mail address of each meeting invitee is typed into a "To" text box 1420. Depending on the capabilities of the personal information manager application 1008a–d, the e-mail address can appear as an alias ("Mark Crohn") 1422 or an enumerated e-mail address ("s.claus@domain.com") 1424. The subject of the virtual meeting is entered into a "Subject" text box 1426. The location of the virtual meeting is entered into a "Location" drop down combo box 1428, which maintains a list of previously entered locations that may be selected in lieu of re-entering a previously entered location.

The scheduling of an on-line meeting is initiated by selected (checking) an on-line meeting check-box 1430. The virtual meeting utility 1006a–d that will be used during the on-line meeting is selected in a virtual meeting utility drop down list box 1432 that is populated with the names of on-line meeting utilities that are registered on the meeting attendees' computers 1000 and 1004a–d (e.g., Microsoft NetMeeting).

The starting date of the virtual meeting is specified in a date combo box 1448 and a start time combo box 1450. The end date and time of the virtual meeting is entered into an end date combo box 1452 and an end time combo box 1454. The virtual meeting utility 1006a–d may be automatically activated near the scheduled start date 1148 and time 1450 by enabling (checking) an "Automatically start NetMeeting with Reminder" check box 1434. As will be discussed in detail below with reference to FIGS. 9A–D, the virtual meeting utility 1006b–d on the meeting participant's computers 1004a–c, requests the IP address 1102 (FIG. 2A) from the ILS server 1010 (FIG. 2) that is named in a "Directory Server" drop-down list box 1436, using the meeting host's 1438 e-mail address that is listed in an "Organizer's e-mail" text box 1440.

The path and document name 1442 of an electronic document 1016 (FIG. 2A) for collaborative editing may be specified in an "Office document" text box 1444. The path and document name 1442 may be for any electronic document 1016 that is accessible to the meeting host's computer 1000. The path and document name 1442 may be typed in or entered by selecting (clicking) a "Browse" command button 1446 and selecting the document 1016 from a displayed directory tree that is well known in the art.

As will be described in detail below, it is preferable that a reminder (FIGS. 10A–C) be displayed to the meeting attendees near the start time 1450 of the virtual meeting. The reminder (FIG. 10A–C) is enabled by selecting (checking) a reminder check-box 1456 and entering or selecting an amount of time in a reminder combo box 1458 that indicates an amount of time before the start time of the virtual meeting that the reminder should be displayed to the meeting attendee. In an actual embodiment of the invention, the reminder (FIGS. 10A–C) is the mechanism by which the virtual meeting utility 1006a–d is automatically started on the meeting attendees' computers 1000 and 1004a–c if the reminder check box 1456 and the "Automatically start NetMeeting with Reminder" check box 1434 are enabled. If the reminder check box 1456 is not enabled (checked), then the "Automatically start NetMeeting with Reminder" check box 1434 is not enabled and may not be selected. The virtual meeting utility 1006a–d may be started automatically on the meeting attendee's computers 1000 and 1004a–c using a mechanism other than a reminder generated by the personal information manager 1008a–d. For instance, a timer utility may automatically start the virtual meeting utility 1006a–c near the time of the virtual meeting without displaying a reminder to the meeting attendee. In addition to automatically starting virtual meeting utility 1006a–d, the timer utility may automatically instruct a reminder generated by another process to start the virtual meeting utility 1006a–d and then to automatically instruct the reminder to remove itself from the display.

A status 1460 selected in a status combo box 1462 will be recorded in the meeting host's personal information manager 1008a and will be displayed on the participant availability screen associated with the participant availability tab 1406. A comment text box 1464 is provided for entering a comment 1466 that will be displayed to the meeting participants. When a category 1468 is selected from a list displayed by activating a category's command button 1470, the personal information manager 1008a–d may sort the meeting request 1402 according to the designated category 1468.

The meeting request 1402 has an information area 1408 that includes information on the current status of the meeting request 1402, such as messages 1410, 1412, and 1414. These messages can include summary information (such as message 1410 that relays that this is an on-line meeting) and the status of the meeting request 1412 (such as whether the meeting invitation has been sent). The information area 1408 may also include warning messages (such as message 1412 that describes the proximity of time and date of the virtual meeting to another meeting scheduled by the personal information manager 1006*a–d*).

When the meeting request 1402 is completed, it is sent to the meeting participants computers 1004*a–c* by selecting (clicking) the "Send" command button 1472. If the meeting host later wishes to cancel the virtual meeting, the meeting request 1402 can be cancelled by selecting a "Cancel Invitation" command button 1474. If the meeting request 1402 is for a reoccurring meetings (e.g., the first Monday of every month), this can be specified by selecting a the "Recurrence" command button 1476 and selecting a reassurance pattern. The personal information manager 1008*a–d* enters the meeting request 1402 on a reoccurring specified when is selected.

Figure 6:
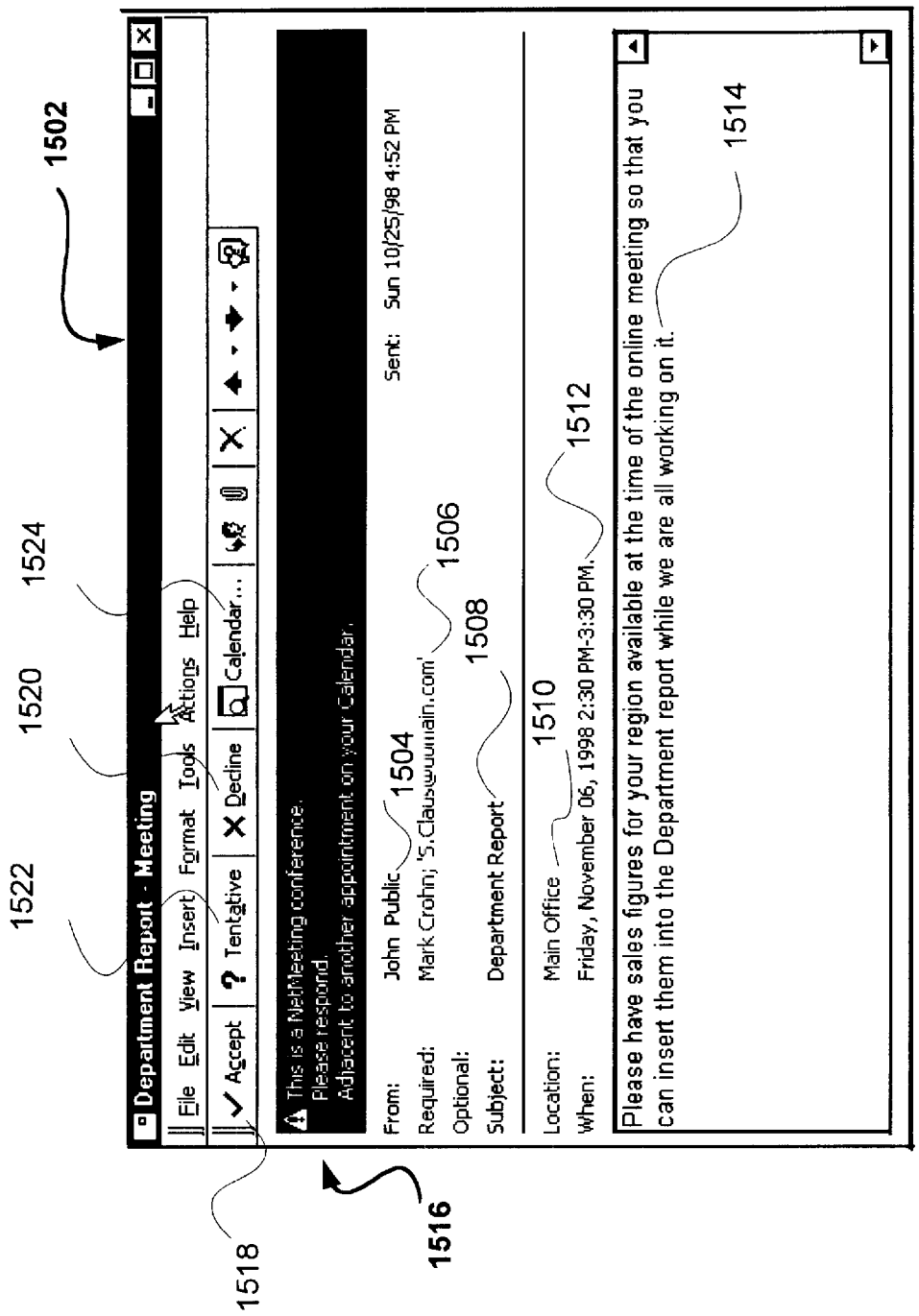
FIG. 6 is a pictorial representation of a meeting invitation received by a meeting participant's computer, in accordance with the present invention.

Returning to FIG. 4, once the virtual meeting request is sent 1312 to each of the meeting participant's computers 1004*a–c*, the virtual meeting request 1402 is recorded 1314 in the meeting host's personal information manager application 1308*a*. As indicated by arrow 1306 between the processes 1302 and 1304, the meeting request 1402 is received as a meeting invitation at the meeting participant's computer 1004*a–c*. An exemplary meeting invitation 1502 is shown in FIG. 6.

The meeting invitation 1502 contains the information contained in the meeting request 1402, which includes the e-mail address (or alias) of the meeting host 1504, the e-mail addresses (or aliases) of the meeting participants 1506, the subject of the meeting 1508, the location of the meeting 1510, the date and time of the meeting 1512, and any included comments 1514. (Items 1506, 1508, 1510, 1512, and 1514 correspond to the information entered in the meeting request 1402 in areas 1420, 1426, 1428, 1448, 1450, 1452, 1454, and 1464, respectively). A meeting invitation information area 1516 displays summary information, status messages, and warnings directed to the meeting participant. The meeting invitation 1502 is accepted by selecting (clicking) an "Accept" command button 1518 or declined by selecting a "Decline" command button 1520, or tentatively acceptance by selecting a "Tentative" command button 1522. Before responding to the meeting invitation 1502, the meeting participant can review an appointment calendar maintained by the personal information manager 1008*b–d* by selecting the "Calendar" command button 1524.

Figure 7:
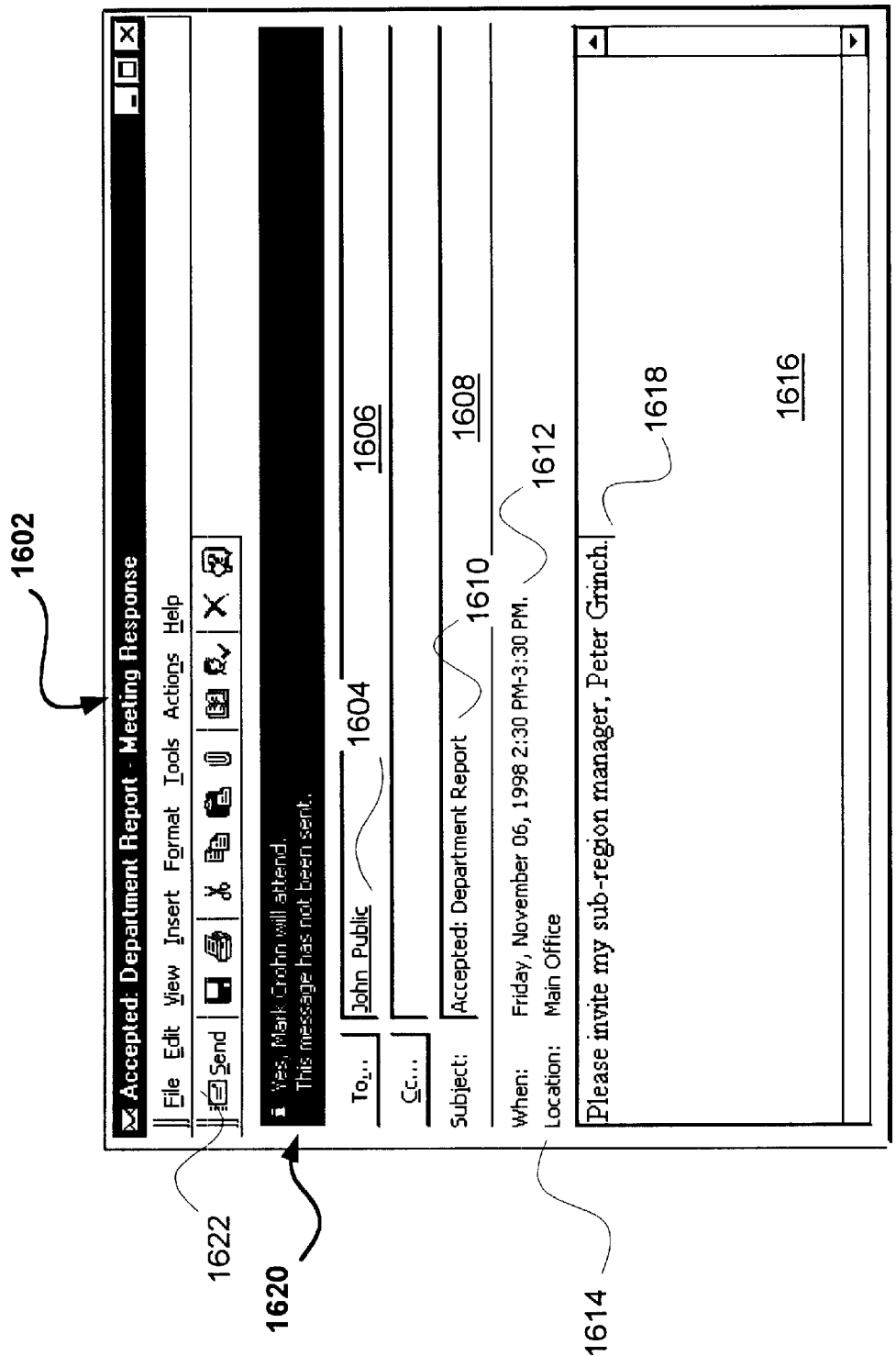
FIG. 7 is pictorial representation of an editable meeting response that is sent by the meeting participant's computer to the meeting host's computer, in accordance with the present invention.

An alternative meeting response 1602 is illustrated in FIG. 7 that allows for the meeting participant to alter the information in the meeting request and add comments. The meeting response 1602 contains the e-mail address or an alias such as a machine name 1604 of the meeting host in a "To" text box 1606. A "Subject" text box 1608 contains the subject 1610 of the virtual meeting and a description of the action taken in the meeting response 1502. The time and date of the meeting 1612 and the location of the meeting 1614 are restated. A meeting response text box 1616 is provided for the insertion of a comment 1618 with the meeting response 1602. A meeting response information area 1620 displays messages regarding the status of the meeting response 1602. The meeting response 1602 is sent to the meeting host by selecting the send command button 1622.

Figure 8:
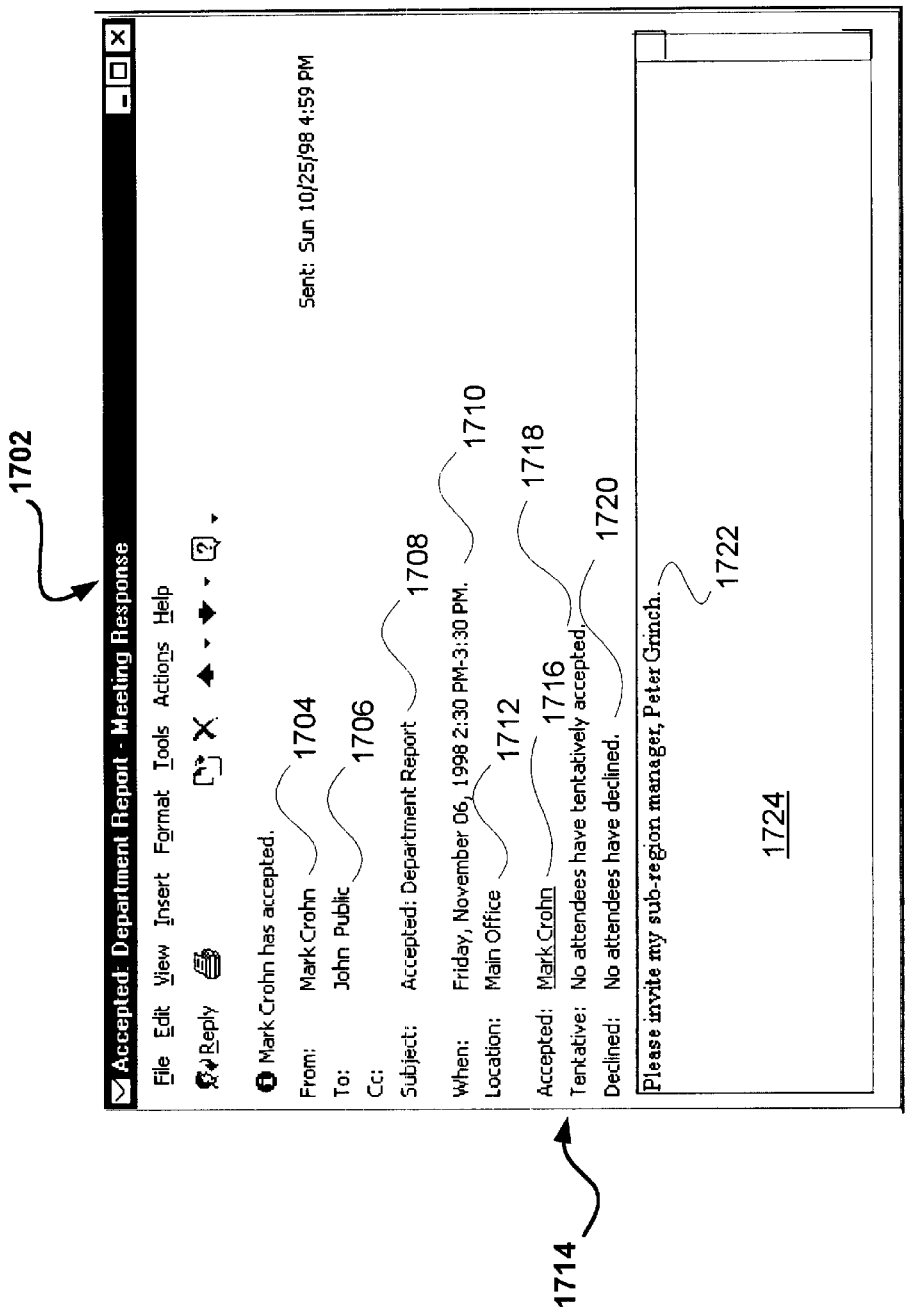
FIG. 8 is a pictorial representation of a meeting acceptance received by the meeting host's computer from the meeting participant's computer, in accordance with the present invention.

Returning to FIG. 4, the virtual meeting invitation 1502 is returned (as indicated by arrow 1308) over the communications network 1002 to the meeting host's computer 1000 as a meeting response as illustrated in FIG. 8. If the virtual meeting was accepted or tentatively accepted 1318 by the meeting participant, then the meeting invitation is entered 1320 into an appointment calendar maintained by the PIM application 1008*b–d* for that meeting participant.

The meeting response 1602 is received 1326 (via arrow 1308 as an email message) as a meeting acceptance 1702 (FIG. 8) and recorded 1326 in the personal information manager 1008*a* on the meeting host's computer 1000. The meeting acceptance 1702 is illustrated in FIG. 8 and summarizes the e-mail address 1704 of the responding meeting participant; the e-mail address (or alias) of the meeting host 1706; whether the meeting participant accepts, tentatively accepts, or declines the virtual meeting 1708; and, the time and location of the meeting 1710 and 1712. There is also a summary 1714 of the results of all meeting responses 1602 received to that point by the meeting host, divided into acceptances 1716, tentative acceptances 1718 and declined invitations 1720. Any comments 1722 included in the meeting response 1602 are displayed in a comment text box 1724.

Returning to FIG. 3, the method and system of the present invention automatically connect 1206 the meeting attendee's computers 1000 and 1004*a–c* to establish a virtual meeting at or near the scheduled time and date of the virtual meeting (as was stored in the virtual meeting request 1502 (FIG. 5)). The present invention causes the personal information manager 1008*a–d* on the meeting host's computer and each of the meeting participant's computers 1004*a–c* to activate the virtual meeting utility 1006*a–d*. The virtual meeting utility 1006*b–d* on the meeting participant's computers 1004*a–c* then use the e-mail address of the meeting host through a directory server 1010 to automatically join 1206 the virtual meeting hosted by the meeting host's computer. The formation 1206 of the virtual meeting is described in detail below with reference to FIGS. 9A–D.

In FIGS. 9A–9D, the automatic connection of the virtual meeting between the meeting host's computer 1000 and the meeting participants computer's 1004*a–c* is illustrated. At or near the scheduled start time of the virtual meeting. (FIG. 5; 1448 and 1450), a meeting host processes 1802 and a meeting participant process 1804 are performed respectively on the meeting host's computer 1000 and on each meeting participant's computer 1004*a–c*. The meeting host process 1802 performed on the meeting host's computer 1000 is illustrated on the left side of FIG. 9A and the meeting participant process 1804 is performed on each meeting participant's computer 1004*a–c* and is illustrated on the right side of FIG. 9A.

The personal information manager 1008*a* is started 1806 on the meeting host's computer 1000 where it waits 1808 until a meeting reminder time that is computed from a reminder time specified in combo box 1458 (FIG. 5). When the reminder time is reached, the stored meeting request 1402 is checked to see if the "Automatically start NetMeeting with Reminder" check box 1434 (FIG. 5) was enabled (checked). If the "Automatically start NetMeeting with Reminder" check box 1434 was not enabled branch 1810, a virtual meeting reminder is displayed 1812 (FIG. 10A) with an option 1920 to start the virtual meeting utility 1006*a* on the meeting host's computer.

Referring to FIG. 10A, the reminder 1902 includes the time and date 1904 of the virtual meeting, the subject of the virtual meeting 1906, and the location of the meeting 1908.

Selecting a dismiss command button 1910 removes the reminder from the display and the reminder 1902 is set to not display again. Selecting the snooze command button 1912 causes the reminder 1904 to reset to display again following the time period 1914 entered into the snooze time combo box 1916. Selecting an "Open Item" command button 1918 opens the meeting request 1402 that is stored in the personal information manager 1008a for review or editing. The "Start NetMeeting" command button 1920 starts the virtual meeting utility 1006a on the meeting host's computer 1000.

Briefly returning to FIG. 9A, if the "Automatically start NetMeeting with Reminder" check box 1434 was enabled in the meeting request 1402 (FIG. 5), a virtual meeting reminder 1922 is displayed 1814 (FIG. 9A), as shown in FIG. 10B. The reminder 1922 illustrated in FIG. 10B differs from the reminder 1902 (FIG. 10A) only in that the start NetMeeting command button 1920 is not displayed because the virtual meeting utility 1006a is automatically started 1822 (FIG. 9B) as the "Automatically start NetMeeting with Reminder" check box 1434 was enabled in the meeting request 1402.

Following the display of the reminder 1902 (FIG. 10A), if the start NetMeeting command button 1920 was selected 1818 (FIG. 9B) or the "Automatically Start NetMeeting with Reminder" check box 1434 was enabled (branch 1820 from FIG. 9A), the virtual meeting utility is directly started 1822 on the meeting host's computer 1000 and automatically configured to host the virtual meeting. If the dismiss command button 1910 is selected in the reminder 1902 before the start NetMeeting command button 1920 is activated (clicked), the process on the meeting host's computer is done 1824 and the virtual meeting will not take place.

Figure 9A:
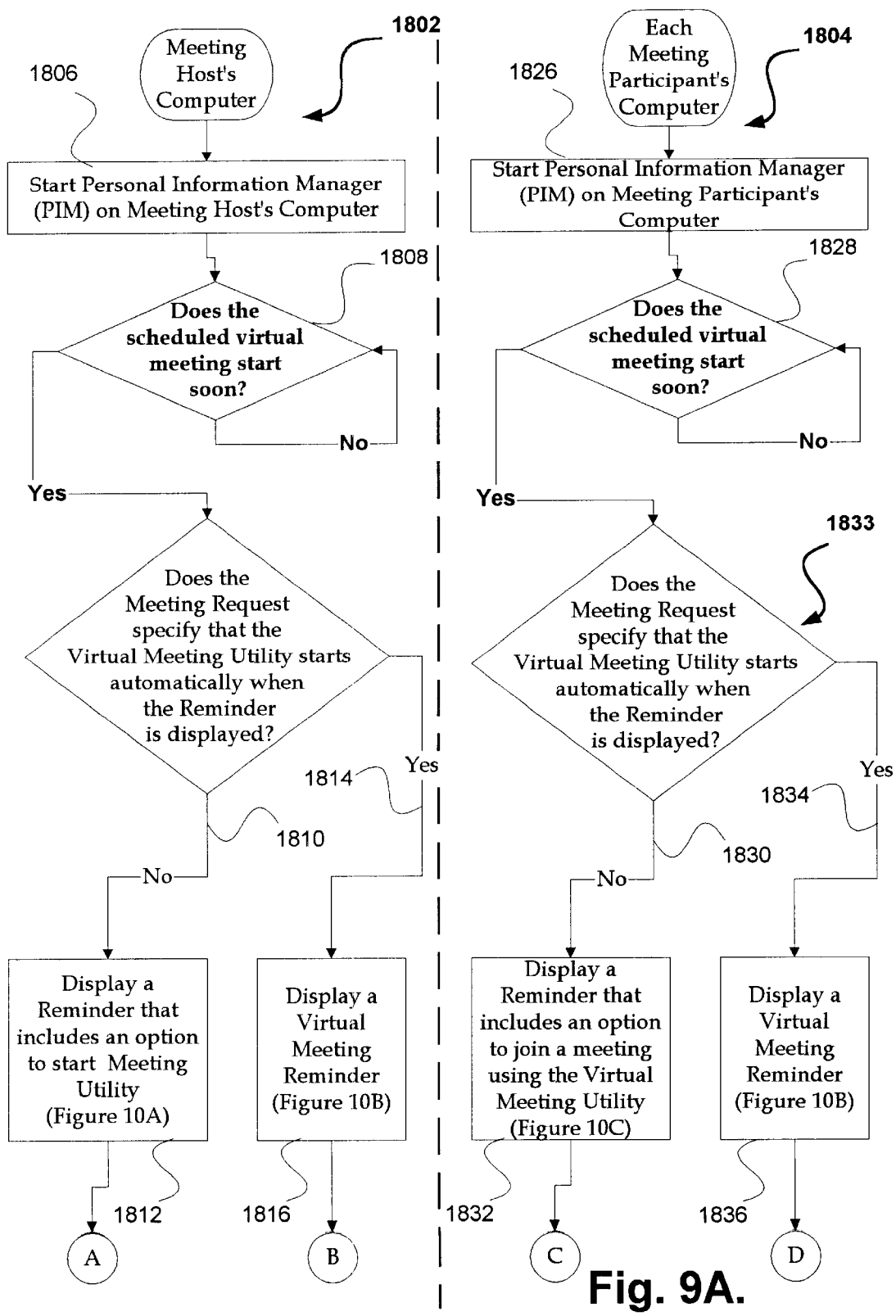
FIGS. 9A–9D illustrates with a pair of functional flow diagrams the process of the present invention performed on a meeting host's computer and the process performed on the meeting participants computer to connect a virtual meeting at the scheduled time, in accordance with the present invention.
Figure 9B:
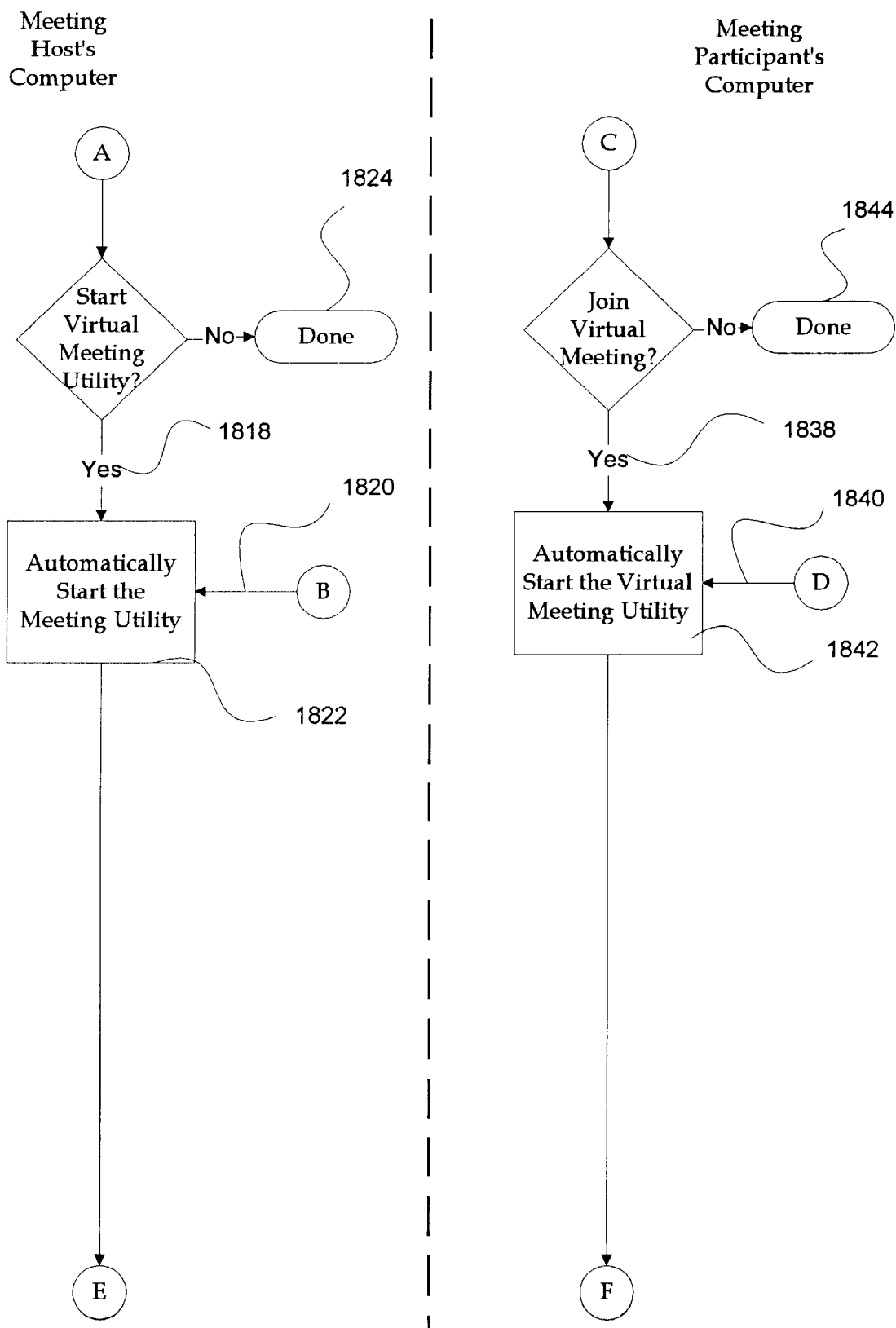

As illustrated in FIGS. 9A and part of 9B, the meeting participant process 1804 mirrors the meeting host process 1802 to the point of starting the virtual meeting utility 1006b–d. The personal information manager 1008b–d is started 1826 on the meeting participant's computer 1004a–c where it waits 1828 until a meeting reminder time that is computed from a reminder time specified in combo box 1458 (FIG. 5). When the reminder time is reached, the stored meeting request 1402 is checked 1833 to see if the "Automatically start NetMeeting with Reminder" check box 1434 (FIG. 5) was enabled (checked). If the "Automatically start NetMeeting with Reminder" check box 1434 was not enabled 1830, a virtual reminder is displayed 1832 (FIG. 10A) with an option 1920 to join the virtual meeting being hosted on the meeting host's computer 1000.

If the "Automatically start NetMeeting with Reminder" check box 1434 was enabled in the meeting request 1402, a virtual meeting reminder 1922 is displayed 1834 (FIG. 9A), as shown in FIG. 10B. The reminder 1922 illustrated in FIG. 10B is substantially similar in both the meeting host process 1802 and the meeting participant process 1804.

If the "Automatically start NetMeeting with Reminder" check box 1434 was not enabled in the meeting request 1402, a virtual meeting reminder 1924 (FIG. 10C) functions in a manner similar to the reminders 1902 and 1922, but includes a "Join NetMeeting" command button 1926 that, when activated, instructs the virtual meeting utility 1906B–D on the meeting participant's computer 1004a–c to automatically join the virtual meeting. Following the display of the reminder 1924 (FIG. 10C), if the "Join NetMeeting" command button 1926 was activated (clicked) 1818 (FIG. 9B) or the "Automatically Start NetMeeting with Reminder" check box 1434 was enabled (branch 1840 from FIG. 9A), the virtual meeting utility is automatically started 1842. If the dismiss command button 1910 is selected in the reminder 1902 before the start NetMeeting command button 1920 is selected, the process on the meeting participant's computer is done 1844 and the virtual meeting will not take place for that meeting participant.

Figure 9C:
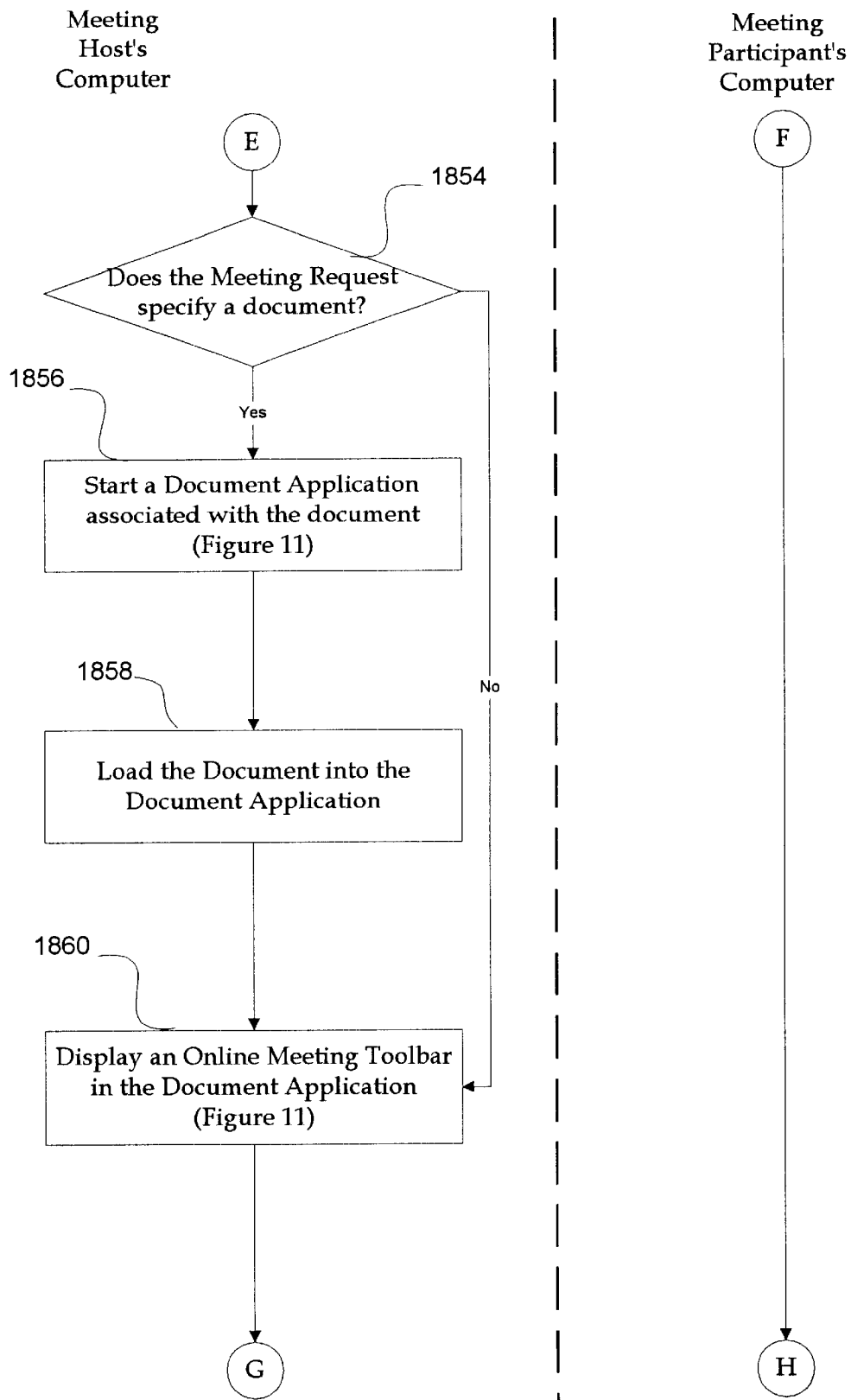
Figure 9D:
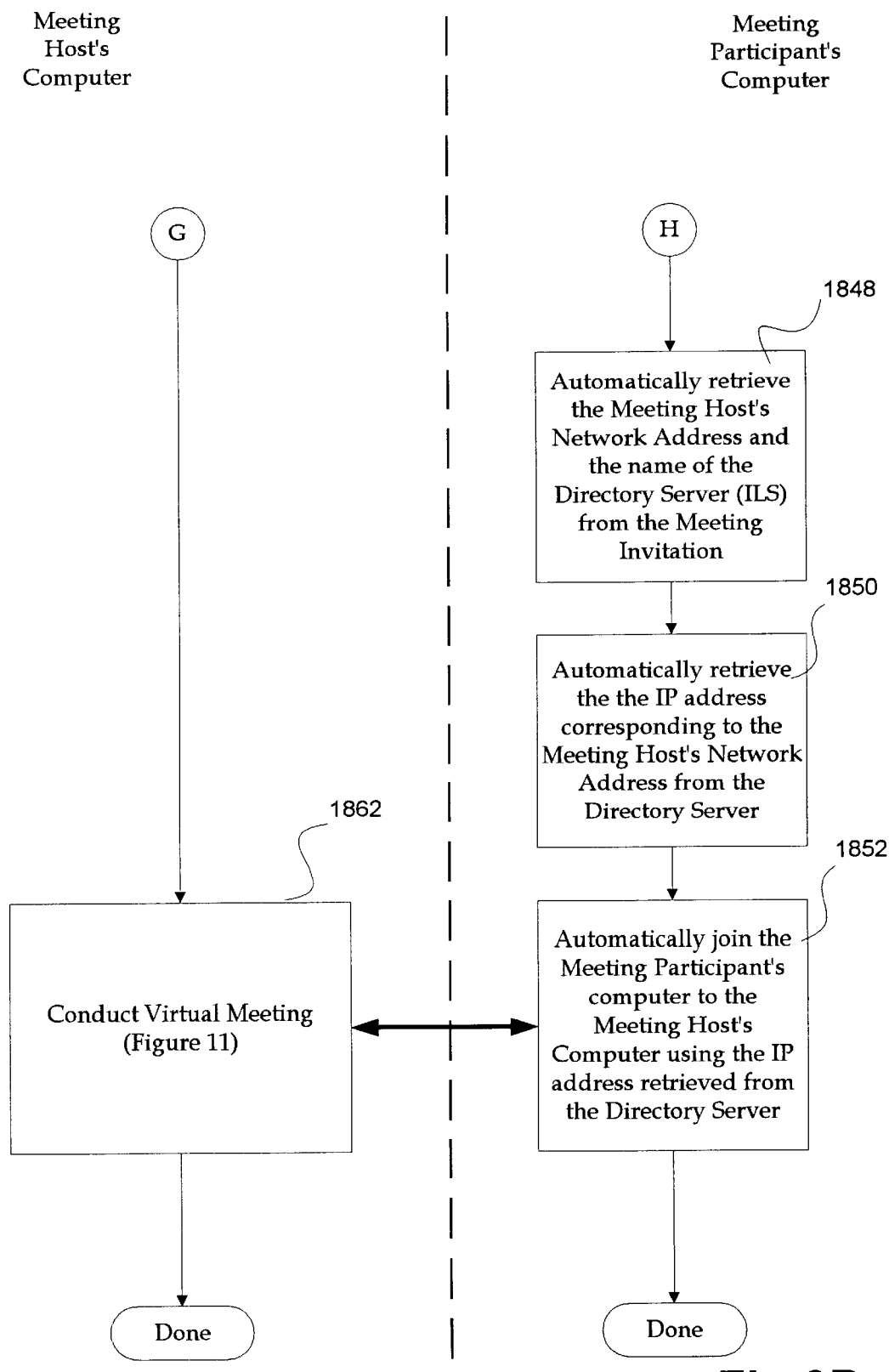

The process for making the connections necessary for the virtual meeting is illustrated beginning in FIG. 9D. The virtual meeting utility 1006b–d automatically retrieves 1848 the network address from the directory server 1010 listed in the directory server combo box 1436 in the meeting request 1402 that is associated with the e-mail address 1438 that is included in the "Organizer's email" combo box 1440 (FIG. 5) in the meeting request 1402. The virtual meeting utility 1006b–d then automatically joins 1852 the meeting participant's computer 1004b–d to the meeting host's computer 1000 using the network address retrieved from the directory server 1010.

Referring to FIG. 9C, after the virtual meeting utility 1006a has automatically been started 1822 (FIG. 9B) on the meeting host's computer 1000, the meeting host process 1804 determines 1854 if the meeting request 1402 contains a path and document 1442 in the "Office document" text box 1444 (FIG. 5). If a document 1442 is specified, then the document editing application associated with the specified document 1442 is started 1856 and the document 1442 is loaded 1858 into the document editing application 1014. An on-line meeting toolbar (FIG. 11; 2004) is displayed 1860 in the document editing application 2002. The virtual meeting is then conducted 1862 (FIG. 9D) until concluded by the meeting host's computer 1000.

Figure 11:
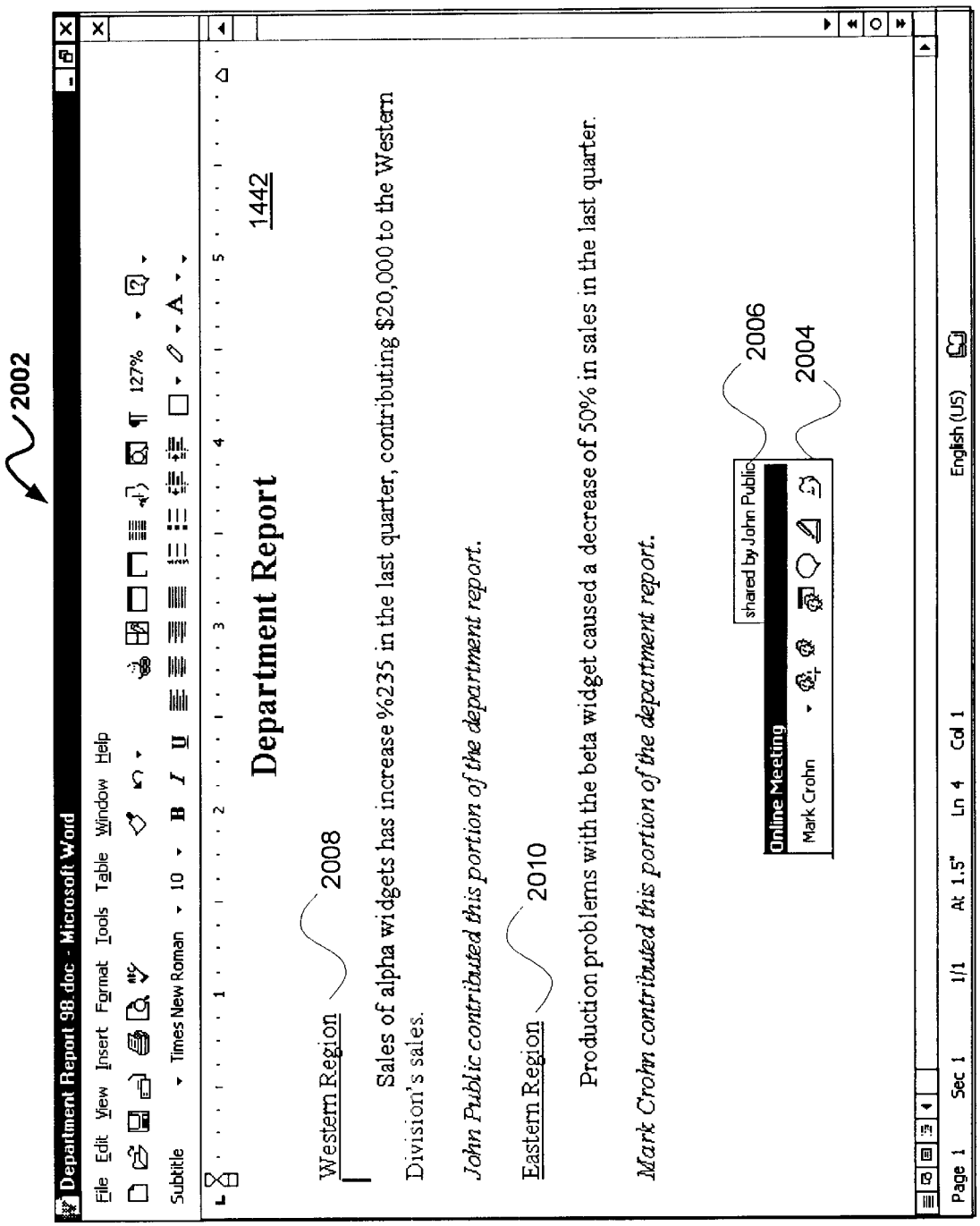
FIG. 11 is a pictorial representation of a document editing application containing a document for collaborative editing that is being shared in a virtual meeting, in accordance with the present invention.

FIG. 11 illustrates a document editing application 2002, which in this example is Microsoft Word, available from Microsoft Corporation, Redmond, Wash. The document editing application 2002 has automatically opened the document 1442 specified in the meeting request 1402 (FIG. 5) for collaborative editing. The virtual meeting toolbar 2004 is displayed within the document editing application 2002, together with a display banner 2006 that displays the name of the meeting host. To illustrate the collaborative editing of the document 1442, assume that the material from the Western region 2008 is entered into the document 1442 from the meeting host's computer 1000 while the material from the Eastern region 2010 is typed into the document 1442 during the same virtual meeting from a meeting participant's computer, e.g., 1004b.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A computer-implemented method for scheduling a virtual meeting between a meeting host and at least one meeting participant, the method comprising:

providing a meeting host's computer having a host virtual meeting utility and a host personal information manager application, the host personal information manager application having a facility for creating and sending a scheduled virtual meeting request over a communication network to at least one meeting participant's computer;

sending the scheduled virtual meeting request from the meeting host computer to each meeting participant's computer, the scheduled virtual meeting request specifying a date and time of a virtual meeting;

providing a meeting participant's personal information manager application on each meeting participant's computer, the meeting participant's personal information manager having a facility for receiving the scheduled virtual meeting request and storing the scheduled virtual meeting request until the date and time of the virtual meeting;

the host personal information manager program invoking the host virtual meeting utility at a first predetermined time before the time and date of the virtual meeting specified in the scheduled virtual meeting request, the host virtual meeting utility being invoked to host the virtual meeting;

the host personal information manager generating a host meeting reminder on the meeting host computer at the predetermined time before the time and date of the virtual meeting specified in the scheduled virtual meeting request;

the meeting participant's personal information manager application invoking the meeting participant virtual meeting utility at a second predetermined time before the time and date of the virtual meeting that is specified in the scheduled virtual meeting request, the participant virtual meeting utility being invoked to join the virtual meeting;

invoking the host virtual meeting utility only if the scheduled meeting request specifies that the host virtual meeting utility should be started at the time the host meeting reminder is generated; and providing an option to activate the host virtual meeting utility from the host meeting reminder.

2. The method of claim 1, wherein the scheduled meeting request includes a reference to a network address of the meeting host's computer that is used by the meeting participant virtual meeting utility to automatically connect to the host virtual meeting utility through the communication network.

3. The method of claim 2, wherein the reference to a network address of the meeting host's computer is an Internet protocol (IP) address.

4. The method of claim 2, wherein the scheduled virtual meeting request specifies an electronic document as a meeting topic for the virtual meeting, the method further comprising:

opening an electronic document specified in the scheduled virtual meeting request on the meeting host's computer at a third predetermined time near the time and date of the virtual meeting specified in the scheduled virtual meeting request, the opening of the electronic document being performed automatically by the host personal information manager, the opening of the electronic document by the host personal information manager, comprising:

retrieving a reference to the electronic document from the virtual meeting request stored by the host personal information manager;

activating an electronic document editing application associated with the electronic document; and loading the electronic document into the electronic document editing application; and receiving a command input from the meeting host's computer, the command input including instructions to the electronic document editing software for the editing of the electronic document.

5. The method of claim 4, further comprising:

interfacing the electronic document editing application with the host virtual meeting utility for the receipt of a virtual command input from each meeting participant's computer during the virtual meeting, the virtual command input including instructions to the electronic document editing software for the editing of the electronic document; and accepting as the command input for the electronic document editing application.

6. A computer-implemented method for scheduling a virtual meeting between a meeting host and at least one meeting participant, the method comprising:

providing a meeting host's computer having a host virtual meeting utility and a host personal information manager application, the host personal information manager application having a facility for creating and sending a scheduled virtual meeting request over a communication network to at least one meeting participant's computer;

sending the scheduled virtual meeting request from the meeting host computer to each meeting participant's computer, the scheduled virtual meeting request specifying a date and time of a virtual meeting;

providing a meeting participant's personal information manager application on each meeting participant's computer, the meeting participant's personal information manager having a facility for receiving the scheduled virtual meeting request and storing the scheduled virtual meeting request until the date and time of the virtual meeting;

the host personal information manager program invoking the host virtual meeting utility at a first predetermined time before the time and date of the virtual meeting specified in the scheduled virtual meeting request, the host virtual meeting utility being invoked to host the virtual meeting;

the host personal information manager generating a host meeting reminder on the meeting host computer at the predetermined time before the time and date of the virtual meeting specified in the scheduled virtual meeting request;

the meeting participant's personal information manager application invoking the meeting participant virtual meeting utility at a second predetermined time before the time and date of the virtual meeting that is specified in the scheduled virtual meeting request, the participant virtual meeting utility being invoked to join the virtual meeting;

generating a meeting participant meeting reminder on the meeting participant's computer at the predetermined time before the time and date of the virtual meeting specified in the scheduled virtual meeting request;

invoking the meeting participant virtual meeting utility only if the scheduled meeting request specifies that the meeting participant virtual meeting utility should be started at the time the meeting participant meeting reminder is generated; and providing an option to activate the meeting participant virtual meeting utility from the meeting participant meeting reminder.

7. The method of claim 6, wherein the scheduled meeting request includes a reference to a network address of the meeting host's computer that is used by the meeting participant virtual meeting utility to automatically connect to the host virtual meeting utility through the communication network.

8. The method of claim 7, wherein the reference to a network address of the meeting host's computer is an Internet Protocol (IP) address.

9. The method of claim 7, wherein the scheduled virtual meeting request specifies an electronic document as a meeting topic for the virtual meeting, the method further comprising:

opening an electronic document specified in the scheduled virtual meeting request on the meeting host's computer at a third predetermined time near the time and date of the virtual meeting specified in the scheduled virtual meeting request, the opening of the electronic document being performed automatically by the host personal information manager, the opening of the electronic document by the host personal information manager, comprising:

retrieving a reference to the electronic document from the virtual meeting request stored by the host personal information manager;

activating an electronic document editing application associated with the electronic document; and loading the electronic document into the electronic document editing application; and receiving a command input from the meeting host's computer, the command input including instructions to the electronic document editing software for the editing of the electronic document.

10. The method of claim 9, further comprising:

interfacing the electronic document editing application with the host virtual meeting utility for the receipt of a virtual command input from each meeting participant's computer during the virtual meeting, the virtual command input including instructions to the electronic document editing software for the editing of the electronic document; and accepting as the command input for the electronic document editing application.

11. A computer-implemented method for scheduling a virtual meeting between a meeting host and at least one meeting participant, the method comprising:

providing a meeting host's computer having a host virtual meeting utility and a host personal information manager application, the host personal information manager application having a facility for creating and sending a scheduled virtual meeting request over a communication network to at least one meeting participant's computer;

sending the scheduled virtual meeting request from the meeting host computer to each meeting participant's computer, the scheduled virtual meeting request specifying a date and time of a virtual meeting and includes a reference to a network address of the meeting host's computer that is used by the meeting participant virtual meeting utility to automatically connect to the host virtual meeting utility through the communication network, wherein the reference to a network address of the meeting host's computer is a meeting host's email address;

providing a meeting participant's personal information manager application on each meeting participant's computer, the meeting participant's personal information manager having a facility for receiving the scheduled virtual meeting request and storing the scheduled virtual meeting request until the date and time of the virtual meeting;

the host personal information manager program invoking the host virtual meeting utility at a first predetermined time before the time and date of the virtual meeting specified in the scheduled virtual meeting request, the host virtual meeting utility being invoked to host the virtual meeting;

the meeting participant's personal information manager application invoking the meeting participant virtual meeting utility at a second predetermined time before the time and date of the virtual meeting that is specified in the scheduled virtual meeting request, the participant virtual meeting utility being invoked to join the virtual meeting;

associating the meeting host email address with a network address for the meeting host's computer;

registering the meeting host's email address together with the associated network address with a directory server, the directory server being connected to the communication network; and the meeting participant's personal information editor automatically connecting to the host virtual meeting utility through the communication network by:

retrieving the meeting host's email address from the scheduled meeting request stored by the meeting participant's personal information manager;

requesting the network address associated with the meeting host's email address from the directory server; and connecting to the meeting host's virtual meeting utility using the network address.

12. The method of claim 11, wherein the communications network is the Internet, the directory server is an ILS server and the network address is an Internet protocol (IP) address.

13. A computer-implemented method for scheduling a virtual meeting between a meeting host and at least one meeting participant, the method comprising:

providing a meeting host's computer having a host virtual meeting utility and a host personal information manager application, the host personal information manager application having a facility for creating and sending a scheduled virtual meeting request over a communication network to at least one meeting participant's computer;

sending the scheduled virtual meeting request from the meeting host computer to each meeting participant's computer, the scheduled virtual meeting request specifying a date and time of a virtual meeting;

providing a meeting participant's personal information manager application on each meeting participant's computer, the meeting participant's personal information manager having a facility for receiving the scheduled virtual meeting request and storing the scheduled virtual meeting request until the date and time of the virtual meeting;

the host personal information manager program invoking the host virtual meeting utility at a first predetermined time before the time and date of the virtual meeting specified in the scheduled virtual meeting request, the host virtual meeting utility being invoked to host the virtual meeting;

the host personal information manager generating a host meeting reminder on the meeting host computer at the predetermined time before the time and date of the virtual meeting specified in the scheduled virtual meeting request;

the meeting participant's personal information manager application invoking the meeting participant virtual meeting utility at a second predetermined time before the time and date of the virtual meeting that is specified in the scheduled virtual meeting request, the participant virtual meeting utility being invoked to join the virtual meeting;

invoking the host virtual meeting utility only if the scheduled virtual meeting request specifies that the host virtual meeting utility should be started at the time the host meeting reminder is generated; and providing an option to join a virtual meeting specified in the host meeting reminder.

14. A computer-implemented method for scheduling a virtual meeting between a meeting host and at least one meeting participant, the method comprising:

providing a meeting host's computer having a host virtual meeting utility and a host personal information manager application, the host personal information manager application having a facility for creating and sending a scheduled virtual meeting request over a communication network to at least one meeting participant's computer;

sending the scheduled virtual meeting request from the meeting host computer to each meeting participant's computer, the scheduled virtual meeting request specifying a date and time of a virtual meeting;

providing a meeting participant's personal information manager application on each meeting participant's computer, the meeting participant's personal information manager having a facility for receiving the scheduled virtual meeting request and storing the scheduled virtual meeting request until the date and time of the virtual meeting;

the host personal information manager program invoking the host virtual meeting utility at a first predetermined time before the time and date of the virtual meeting specified in the scheduled virtual meeting request, the host virtual meeting utility being invoked to host the virtual meeting;

the host personal information manager generating a host meeting reminder on the meeting host computer at the predetermined time before the time and date of the virtual meeting specified in the scheduled virtual meeting request;

the meeting participant's personal information manager application invoking the meeting participant virtual meeting utility at a second predetermined time before the time and date of the virtual meeting that is specified in the scheduled virtual meeting request, the participant virtual meeting utility being invoked to join the virtual meeting;

invoking the host virtual meeting utility only if the scheduled virtual meeting request specifies that the host virtual meeting utility should be started at the time the host meeting reminder is generated; and automatically joining a virtual meeting specified in the host meeting reminder.

15. A computer-implemented method for scheduling a virtual meeting between a meeting host and at least one meeting participant, the method comprising:

providing a meeting host's computer having a host virtual meeting utility and a host personal information manager application, the host personal information manager application having a facility for creating and sending a scheduled virtual meeting request over a communication network to at least one meeting participants computer;

sending the scheduled virtual meeting request from the meeting host computer to each meeting participant's computer, the scheduled virtual meeting request specifying a date and time of a virtual meeting;

providing a meeting participant's personal information manager application on each meeting participant's computer, the meeting participant's personal information manager having a facility for receiving the scheduled virtual meeting request and storing the scheduled virtual meeting request until the date and time of the virtual meeting;

the host personal information manager program invoking the host virtual meeting utility at a first predetermined time before the time and date of the virtual meeting specified in the scheduled virtual meeting request, the host virtual meeting utility being invoked to host the virtual meeting;

the host personal information manager generating a host meeting reminder on the meeting host computer at the predetermined time before the time and date of the virtual meeting specified in the scheduled virtual meeting request;

the meeting participant's personal information manager application invoking the meeting participant virtual meeting utility at a second predetermined time before the time and date of the virtual meeting that is specified in the scheduled virtual meeting request, the participant virtual meeting utility being invoked to join the virtual meeting;

generating a meeting participant meeting reminder on the meeting participant's computer at the predetermined time before the time and date of the virtual meeting specified in the scheduled virtual meeting request;

invoking the meeting participant virtual meeting utility only if the scheduled virtual meeting request specifies that the meeting participant virtual meeting utility should be started at the time the meeting participant meeting reminder is generated; and providing an option to join a virtual meeting specified in the participant meeting reminder.

16. A computer-implemented method for scheduling a virtual meeting between a meeting host and at least one meeting participant, the method comprising:

providing a meeting host's computer having a host virtual meeting utility and a host personal information manager application, the host personal information manager application having a facility for creating and sending a scheduled virtual meeting request over a communication network to at least one meeting participant's computer;

sending the scheduled virtual meeting request from the meeting host computer to each meeting participant's computer, the scheduled virtual meeting request specifying a date and time of a virtual meeting;

providing a meeting participant's personal information manager application on each meeting participant's computer, the meeting participant's personal information manager having a facility for receiving the scheduled virtual meeting request and storing the scheduled virtual meeting request until the date and time of the virtual meeting;

the host personal information manager program invoking the host virtual meeting utility at a first predetermined time before the time and date of the virtual meeting specified in the scheduled virtual meeting request, the host virtual meeting utility being invoked to host the virtual meeting;

the host personal information manager generating a host meeting reminder on the meeting host computer at the predetermined time before the time and date of the virtual meeting specified in the scheduled virtual meeting request;

the meeting participant's personal information manager application invoking the meeting participant virtual meeting utility at a second predetermined time before the time and date of the virtual meeting that is specified in the scheduled virtual meeting request, the participant virtual meeting utility being invoked to join the virtual meeting;

generating a meeting participant meeting reminder on the meeting participant's computer at the predetermined time before the time and date of the virtual meeting specific in the scheduled virtual meeting request;

invoking the meeting participant virtual meeting utility only if the scheduled virtual meeting request specifies that the meeting participant virtual meeting utility should be started at the time the host meeting participant meeting reminder is generated; and automatically joining a virtual meeting specified in the participant meeting reminder.

17. A computer-readable medium having a computer executable component for scheduling a virtual meeting between a meeting host and at least one meeting participant, wherein the computer executable component schedules a virtual meeting by:

providing access to a meeting host's computer having a host virtual meeting utility and a host personal information manager application, the host personal information manager application having a facility for creating and sending a scheduled virtual meeting request over a communication network to at least one meeting participant's computer;

sending the scheduled virtual meeting request from the meeting host computer to each meeting participant's computer, the scheduled virtual meeting request specifying a date and time of a virtual meeting;

providing a meeting participant's personal information manager application on each meeting participant's computer, the meeting participant's personal information manager having a facility for receiving the scheduled virtual meeting request and storing the scheduled virtual meeting request until the date and time of the virtual meeting;

the host personal information manager program invoking the host virtual meeting utility at a first predetermined time before the time and date of the virtual meeting specified in the scheduled virtual meeting request, the host virtual meeting utility being invoked to host the virtual meeting;

the host personal information manager generating a host meeting reminder on the meeting host computer at the predetermined time before the time and date of the virtual meeting specified in the scheduled virtual meeting request;

the meeting participant's personal information manager application invoking the meeting participant virtual meeting utility at a second predetermined time before the time and date of the virtual meeting that is specified in the scheduled virtual meeting request, the participant virtual meeting utility being invoked to join the virtual meeting;

invoking the host virtual meeting utility only if the scheduled meeting request specifies that the host virtual meeting utility should be started at the time the host meeting reminder is generated; and providing an option to activate the host virtual meeting utility from the host meeting reminder.

18. The computer-readable medium of claim 17, wherein the scheduled meeting request includes a reference to a network address of the meeting host's computer that is used by the meeting participant virtual meeting utility to automatically connect to the host virtual meeting utility through the communication network.

19. The computer-readable medium of claim 18, wherein the reference to a network address of the meeting host's computer is an Internet Protocol (IP) address.

20. The computer-readable medium of claim 18, wherein the scheduled virtual meeting request specifies an electronic document as a meeting topic for the virtual meeting, the executable component further comprising:

opening an electronic document specified in the scheduled virtual meeting request on the meeting host's computer at a third predetermined time near the time and date of the virtual meeting specified in the scheduled virtual meeting request, the opening of the electronic document being performed automatically by the host personal information manager, the opening of the electronic document by the host personal information manager, comprising:

retrieving a reference to the electronic document from the virtual meeting request stored by the host personal information manager;

activating an electronic document editing application associated with the electronic document; and loading the electronic document into the electronic document editing application; and receiving a command input from the meeting host's computer, the command input including instructions to the electronic document editing software for the editing of the electronic document.

21. The computer-readable medium of claim 20, further comprising:

interfacing the electronic document editing application with the host virtual meeting utility for the receipt of a virtual command input from each meeting participant's computer during the virtual meeting, the virtual command input including instructions to the electronic document editing software for the editing of the electronic document; and accepting as the command input for the electronic document editing application.

22. A computer-readable medium having a computer executable component for scheduling a virtual meeting between a meeting host and at least one meeting participant, wherein the computer executable component schedules a virtual meeting by:

providing access to a meeting host's computer having a host virtual meeting utility and a host personal information manager application, the host personal information manager application having a facility for creating and sending a scheduled virtual meeting request over a communication network to at least one meeting participant's computer;

sending the scheduled virtual meeting request from the meeting host computer to each meeting participant's computer, the scheduled virtual meeting request specifying a date and time of a virtual meeting;

providing a meeting participant's personal information manager application on each meeting participant's computer, the meeting participant's personal information manager having a facility for receiving the scheduled virtual meeting request and storing the scheduled virtual meeting request until the date and time of the virtual meeting;

the host personal information manager program invoking the host virtual meeting utility at a first predetermined time before the time and date of the virtual meeting specified in the scheduled virtual meeting request, the host virtual meeting utility being invoked to host the virtual meeting;

the host personal information manager generating a host meeting reminder on the meeting host computer at the predetermined time before the time and date of the virtual meeting specified in the scheduled virtual meeting request;

the meeting participant's personal information manager application invoking the meeting participant virtual meeting utility at a second predetermined time before the time and date of the virtual meeting that is specified in the scheduled virtual meeting request, the participant virtual meeting utility being invoked to join the virtual meeting;

generating a meeting participant meeting reminder on the meeting participant's computer at the predetermined time before the time and date of the virtual meeting specified in the scheduled virtual meeting request;

invoking the meeting participant virtual meeting utility only if the scheduled meeting request specifies that the meeting participant virtual meeting utility should be started at the time the meeting participant meeting reminder is generated; and providing an option to activate the meeting participant virtual meeting utility from the meeting participant meeting reminder.

23. The computer-readable medium of claim 22, wherein the scheduled meeting request includes a reference to a network address of the meeting host's computer that is used by the meeting participant virtual meeting utility to automatically connect to the host virtual meeting utility through the communication network.

24. The computer-readable medium of claim 23, wherein the reference to a network address of the meeting host's computer is an Internet Protocol (IP) address.

25. The computer-readable medium of claim 23, wherein the scheduled virtual meeting request specifies an electronic document as a meeting topic for the virtual meeting, the executable component further comprising:

opening an electronic document specified in the scheduled virtual meeting request on the meeting host's computer at a third predetermined time near the time and date of the virtual meeting specified in the scheduled virtual meeting request, the opening of the electronic document being performed automatically by the host personal information manager, the opening of the electronic document by the host personal information manager, comprising:

retrieving a reference to the electronic document from the virtual meeting request stored by the host personal information manager;

activating an electronic document editing application associated with the electronic document; and loading the electronic document into the electronic document editing application; and receiving a command input from the meeting host's computer, the command input including instructions to the electronic document editing software for the editing of the electronic document.

26. The computer-readable medium of claim 25, further comprising:

interfacing the electronic document editing application with the host virtual meeting utility for the receipt of a virtual command input from each meeting participant's computer during the virtual meeting, the virtual command input including instructions to the electronic document editing software for the editing of the electronic document; and accepting as the command input for the electronic document editing application.

27. A computer-readable medium having a computer executable component for scheduling a virtual meeting between a meeting host and at least one meeting participant, wherein the computer executable component schedules a virtual meeting by:

providing access to a meeting host's computer having a host virtual meeting utility and a host personal information manager application, the host personal information manager application having a facility for creating and sending a scheduled virtual meeting request over a communication network to at least one meeting participant's computer;

sending the scheduled virtual meeting request from the meeting host computer to each meeting participant's computer, the scheduled virtual meeting request specifying a date and time of a virtual meeting and including a reference to a network address of the meeting host's computer that is used by the meeting participant virtual meeting utility to automatically connect to the host virtual meeting utility through the communication network, wherein the reference to a network address of the meeting host's computer is a meeting host's email address;

providing a meeting participant's personal information manager application on each meeting participant's computer, the meeting participant's personal information manager having a facility for receiving the scheduled virtual meeting request and storing the scheduled virtual meeting request until the date and time of the virtual meeting;

the host personal information manager program invoking the host virtual meeting utility at a first predetermined time before the time and date of the virtual meeting specified in the scheduled virtual meeting request, the host virtual meeting utility being invoked to host the virtual meeting;

the meeting participant's personal information manager application invoking the meeting participant virtual meeting utility at a second predetermined time before the time and date of the virtual meeting that is specified in the scheduled virtual meeting request, the participant virtual meeting utility being invoked to join the virtual meeting;

associating the meeting host email address with a network address for the meeting host's computer;

registering the meeting host's email address together with the associated network address with a directory server, the directory server being connected to the communication network; and the meeting participant's personal information editor automatically connecting to the host virtual meeting utility through the communication network by:

retrieving the meeting host's email address from the scheduled meeting request stored by the meeting participant's personal information manager;

requesting the network address associated with the meeting host's email address from the directory server; and connecting to the meeting host's virtual meeting utility using the network address.

28. The computer-readable medium of claim 27, wherein the communications network is the Internet, the directory server is an ILS server and the network address is an Internet Protocol (IP) address.

29. A computer-readable medium having a computer executable component for scheduling a virtual meeting between a meeting host and at least one meeting participant, wherein the computer executable component schedules a virtual meeting by:

providing access to a meeting host's computer having a host virtual meeting utility and a host personal information manager application, the host personal information manager application having a facility for creating and sending a scheduled virtual meeting request over a communication network to at least one meeting participant's computer;

sending the scheduled virtual meeting request from the meeting host's computer to each meeting participant's computer, the scheduled virtual meeting request specifying a date and time of a virtual meeting;

providing a meeting participant's personal information manager application on each meeting participant's computer, the meeting participant's personal information manager having a facility for receiving the scheduled virtual meeting request and storing the scheduled virtual meeting request until the date and time of the virtual meeting;

the host personal information manager program invoking the host virtual meeting utility at a first predetermined time before the time and date of the virtual meeting specified in the scheduled virtual meeting request, the host virtual meeting utility being invoked to host the virtual meeting;

the host personal information manager generating a host meeting reminder on the meeting host's computer at the predetermined time before the time and date of the virtual meeting specified in the scheduled virtual meeting request;

the meeting participant's personal information manager application invoking the meeting participant virtual meeting utility at a second predetermined time before the time and date of the virtual meeting that is specified in the scheduled virtual meeting request, the participant virtual meeting utility being invoked to join the virtual meeting; invoking the host virtual meeting utility only if the scheduled virtual meeting request specifies that the host virtual meeting utility should be started at the time the host meeting reminder is generated; and providing an option to join a virtual meeting specified in the host meeting reminder.

30. A computer-readable medium having a computer executable component for scheduling a virtual meeting between a meeting host and at least one meeting participant, wherein the computer executable component schedules a virtual meeting by:

providing access to a meeting host's computer having a host virtual meeting utility and a host personal information manager application, the host personal information manager application having a facility for creating and sending a scheduled virtual meeting request over a communication network to at least one meeting participant's computer;

sending the scheduled virtual meeting request from the meeting host's computer to each meeting participant's computer, the scheduled virtual meeting request specifying a date and time of a virtual meeting;

providing a meeting participant's personal information manager application on each meeting participant's computer, the meeting participant's personal information manager having a facility for receiving the scheduled virtual meeting request and storing the scheduled virtual meeting request until the date and time of the virtual meeting;

the host personal information manager program invoking the host virtual meeting utility at a first predetermined time before the time and date of the virtual meeting specified in the scheduled virtual meeting request, the host virtual meeting utility being invoked to host the virtual meeting;

the host personal information manager generating a host meeting reminder on the meeting host's computer at the predetermined time before the time and date of the virtual meeting specified in the scheduled virtual meeting request;

the meeting participant's personal information manager application invoking the meeting participant virtual meeting utility at a second predetermined time before the time and date of the virtual meeting that is specified in the scheduled virtual meeting request, the participant virtual meeting utility being invoked to join the virtual meeting;

invoking the host virtual meeting utility only if the scheduled virtual meeting request specifies that the host virtual meeting utility should be started at the time the host meeting reminder is generated; and automatically joining a virtual meeting specified in the host meeting reminder.

31. A computer-readable medium having a computer executable component for scheduling a virtual meeting between a meeting host and at least one meeting participant, wherein the computer executable component schedules a virtual meeting by:

providing access to a meeting host's computer having a host virtual meeting utility and a host personal information manager application, the host personal information manager application having a facility for creating and sending a scheduled virtual meeting request over a communication network to at least one meeting participant's computer;

sending the scheduled virtual meeting request from the meeting host's computer to each meeting participant's computer, the scheduled virtual meeting request specifying a date and time of a virtual meeting;

providing a meeting participant's personal information manager application on each meeting participant's computer, the meeting participant's personal information manager having a facility for receiving the scheduled virtual meeting request and storing the scheduled virtual meeting request until the date and time of the virtual meeting;

the host personal information manager program invoking the host virtual meeting utility at a first predetermined time before the time and date of the virtual meeting specified in the scheduled virtual meeting request, the host virtual meeting utility being invoked to host the virtual meeting;

the host personal information manager generating a host meeting reminder on the meeting host's computer at the predetermined time before the time and date of the virtual meeting specified in the scheduled virtual meeting request;

the meeting participant's personal information manager application invoking the meeting participant virtual meeting utility at a second predetermined time before the time and date of the virtual meeting that is specified in the scheduled virtual meeting request, the participant virtual meeting utility being invoked to join the virtual meeting;

generating a meeting participant meeting reminder on the meeting participant's computer at the predetermined time before the time and date of the virtual meeting specified in the scheduled virtual meeting request;

invoking the meeting participant virtual meeting utility only if the scheduled virtual meeting request specifies that the meeting participant virtual meeting utility should be started at the time the meeting participant meeting reminder is generated; and providing an option to join a virtual meeting specified in the participant meeting reminder.

32. A computer-readable medium having a computer executable component for scheduling a virtual meeting between a meeting host and at least one meeting participant, wherein the computer executable component schedules a virtual meeting by:

providing access to a meeting host's computer having a host virtual meeting utility and a host personal information manager application, the host personal information manager application having a facility for creating and sending a scheduled virtual meeting request over a communication network to at least one meeting participant's computer;

sending the scheduled virtual meeting request from the meeting host's computer to each meeting participant's computer, the scheduled virtual meeting request specifying a date and time of a virtual meeting;

providing a meeting participant's personal information manager application on each meeting participant's computer, the meeting participant's personal information manager having a facility for receiving the scheduled virtual meeting request and storing the scheduled virtual meeting request until the date and time of the virtual meeting;

the host personal information manager program invoking the host virtual meeting utility at a first predetermined time before the time and date of the virtual meeting specified in the scheduled virtual meeting request, the host virtual meeting utility being invoked to host the virtual meeting;

the host personal information manager generating a host meeting reminder on the meeting host's computer at the predetermined time before the time and date of the virtual meeting specified in the scheduled virtual meeting request;

the meeting participant's personal information manager application invoking the meeting participant virtual meeting utility at a second predetermined time before the time and date of the virtual meeting that is specified in the scheduled virtual meeting request, the participant virtual meeting utility being invoked to join the virtual meeting;

generating a meeting participant meeting reminder on the meeting participant's computer at the predetermined time before the time and date of the virtual meeting specified in the scheduled virtual meeting request;

invoking the meeting participant virtual meeting utility only if the scheduled virtual meeting request specifies that the meeting participant virtual meeting utility should be started at the time the meeting participant meeting reminder is generated; and automatically joining a virtual meeting specified in the participant meeting reminder.

33. A system for scheduling a virtual meeting between a meeting host and at least one meeting participant, the system comprising:

a meeting host's computer having a host virtual meeting utility and a host personal information manager application, the host personal information manager application having a facility for creating and sending a scheduled virtual meeting request over a communication network to at least one meeting participant's computer;

means for sending the scheduled virtual meeting request from the meeting host's computer to each meeting participant's computer, the scheduled virtual meeting request specifying a date and time of a virtual meeting;

means for providing a meeting participant's personal information manager application on each meeting participant's computer, the meeting participant's personal information manager having a facility for receiving the scheduled virtual meeting request and storing the scheduled virtual meeting request until the date and time of the virtual meeting;

means for the host personal information manager program invoking the host virtual meeting utility at a first predetermined time before the time and date of the virtual meeting specified in the scheduled virtual meeting request, the host virtual meeting utility being invoked to host the virtual meeting;

means for the host personal information manager generating a host meeting reminder on the meeting host's computer at the predetermined time before the time and date of the virtual meeting specified in the scheduled virtual meeting request;

means for the meeting participant's personal information manager application invoking the meeting participant virtual meeting utility at a second predetermined time before the time and date of the virtual meeting that is specified in the scheduled virtual meeting request, the participant virtual meeting utility being invoked to join the virtual meeting;

means for invoking the host virtual meeting utility only if the scheduled meeting request specifies that the host virtual meeting utility should be started at the time the host meeting reminder is generated; and means for providing an option to activate the host virtual meeting utility from the host meeting reminder.

34. The system of claim 33 wherein the scheduled meeting request includes a reference to a network address of the meeting host's computer that is used by the meeting participant virtual meeting utility to automatically connect to the host virtual meeting utility through the communication network.

35. The system of claim 34, wherein the reference to a network address of the meeting host's computer is an Internet Protocol (IP) address.

36. The system of claim 34, wherein the scheduled virtual meeting request specifies an electronic document as a meeting topic for the virtual meeting, the system further comprising:
  means for opening an electronic document specified in the scheduled virtual meeting request on the meeting host's computer at a third predetermined time near the time and date of the virtual meeting specified in the scheduled virtual meeting request, the opening of the electronic document being performed automatically by the host personal information manager, the means for opening of the electronic document by the host personal information manager, comprising:
  means for retrieving a reference to the electronic document from the virtual meeting request stored by the host personal information manager;
  means for activating an electronic document editing application associated with the electronic document; and
  means for loading the electronic document into the electronic document editing application; and
  means for receiving a command input from the meeting host's computer, the command input including instructions to the electronic document editing software for the editing of the electronic document.

37. The system of claim 36, further comprising:
  means for interfacing the electronic document editing application with the host virtual meeting utility for the receipt of a virtual command input from each meeting participant's computer during the virtual meeting, the virtual command input including instructions to the electronic document editing software for the editing of the electronic document; and
  means for accepting as the command input for the electronic document editing application.

38. A system for scheduling a virtual meeting between a meeting host and at least one meeting participant, the system comprising:
  a meeting host's computer having a host virtual meeting utility and a host personal information manager application, the host personal information manager application having a facility for creating and sending a scheduled virtual meeting request over a communication network to at least one meeting participant's computer;
  means for sending the scheduled virtual meeting request from the meeting host's computer to each meeting participant's computer, the scheduled virtual meeting request specifying a date and time of a virtual meeting;
  means for providing a meeting participant's personal information manager application on each meeting participant's computer, the meeting participant's personal information manager having a facility for receiving the scheduled virtual meeting request and storing the scheduled virtual meeting request until the date and time of the virtual meeting;
  means for the host personal information manager program invoking the host virtual meeting utility at a first predetermined time before the time and date of the virtual meeting specified in the scheduled virtual meeting request, the host virtual meeting utility being invoked to host the virtual meeting;
  means for the host personal information manager generating a host meeting reminder on the meeting host's computer at the predetermined time before the time and date of the virtual meeting specified in the scheduled virtual meeting request;
  means for the meeting participant's personal information manager application invoking the meeting participant virtual meeting utility at a second predetermined time before the time and date of the virtual meeting that is specified in the scheduled virtual meeting request, the participant virtual meeting utility being invoked to join the virtual meeting;
  means for generating a meeting participant meeting reminder on the meeting participant's computer at the predetermined time before the time and date of the virtual meeting specified in the scheduled virtual meeting request;
  means for invoking the meeting participant virtual meeting utility only if the scheduled meeting request specifies that the meeting participant virtual meeting utility should be started at the time the meeting participant meeting reminder is generated; and
  means for providing an option to activate the meeting participant virtual meeting utility from the meeting participant meeting reminder.

39. The system of claim 38, wherein the scheduled meeting request includes a reference to a network address of the meeting host's computer that is used by the meeting participant virtual meeting utility to automatically connect to the host virtual meeting utility through the communication network.

40. The system of claim 39, wherein the reference to a network address of the meeting host's computer is an Internet Protocol (IP) address.

41. The system of claim 39, wherein the scheduled virtual meeting request specifies an electronic document as a meeting topic for the virtual meeting, the system further comprising:
  means for opening an electronic document specified in the scheduled virtual meeting request on the meeting host's computer at a third predetermined time near the time and date of the virtual meeting specified in the scheduled virtual meeting request, the opening of the electronic document being performed automatically by the host personal information manager, the means for opening of the electronic document by the host personal information manager, comprising:
  means for retrieving a reference to the electronic document from the virtual meeting request stored by the host personal information manager;
  means for activating an electronic document editing application associated with the electronic document; and
  means for loading the electronic document into the electronic document editing application; and
  means for receiving a command input from the meeting host's computer, the command input including instructions to the electronic document editing software for the editing of the electronic document.

42. The system of claim 41, further comprising:
  means for interfacing the electronic document editing application with the host virtual meeting utility for the receipt of a virtual command input from each meeting participant's computer during the virtual meeting, the virtual command input including instructions to the electronic document editing software for the editing of the electronic document; and
  means for accepting as the command input for the electronic document editing application.

43. A system for scheduling a virtual meeting between a meeting host and at least one meeting participant, the system comprising:

a meeting host's computer having a host virtual meeting utility and a host personal information manager application, the host personal information manager application having a facility for creating and sending a scheduled virtual meeting request over a communication network to at least one meeting participant's computer;

means for sending the scheduled virtual meeting request from the meeting host's computer to each meeting participant's computer, the scheduled virtual meeting request specifying a date and time of a virtual meeting and includes a reference to a network address of the meeting host's computer that is used by the meeting participant virtual meeting utility to automatically connect to the host virtual meeting utility through the communication network, wherein the reference to a network address of the meeting host's computer is a meeting host's email address;

a meeting participant's personal information manager application on each meeting participant's computer, the meeting participant's personal information manager having a facility for receiving the scheduled virtual meeting request and storing the scheduled virtual meeting request until the date and time of the virtual meeting;

means for the host personal information manager program invoking the host virtual meeting utility at a first predetermined time before the time and date of the virtual meeting specified in the scheduled virtual meeting request, the host virtual meeting utility being invoked to host the virtual meeting;

means for the meeting participant's personal information manager application invoking the meeting participant virtual meeting utility at a second predetermined time before the time and date of the virtual meeting that is specified in the scheduled virtual meeting request, the participant virtual meeting utility being invoked to join the virtual meeting;

means for associating the meeting host's email address with a network address for the meeting host's computer;

means for means for registering the meeting host's email address together with the associated network address with a directory server, the directory server being connected to the communication network; and means for the meeting participant's personal information editor automatically connecting to the host virtual meeting utility through the communication network by:

retrieving the meeting host's email address from the scheduled meeting request stored by the meeting participant's personal information manager;

requesting the network address associated with the meeting host's email address from the directory server; and connecting to the meeting host's virtual meeting utility using the network address.

44. The system of claim 43, wherein the communications network is the Internet, the directory server is an ILS server and the network address is an Internet Protocol (IP) address.

45. A system for scheduling a virtual meeting between a meeting host and at least one meeting participant, the system comprising:

a meeting host's computer having a host virtual meeting utility and a host personal information manager application, the host personal information manager application having a facility for creating and sending a scheduled virtual meeting request over a communication network to at least one meeting participant's computer;

means for sending the scheduled virtual meeting request from the meeting host computer to each meeting participant's computer, the scheduled virtual meeting request specifying a date and time of a virtual meeting;

a meeting participant's personal information manager application on each meeting participant's computer, the meeting participant's personal information manager having a facility for receiving the scheduled virtual meeting request and storing the scheduled virtual meeting request until the date and time of the virtual meeting;

means for the host personal information manager program invoking the host virtual meeting utility at a first predetermined time before the time and date of the virtual meeting specified in the scheduled virtual meeting request, the host virtual meeting utility being invoked to host the virtual meeting;

means for the host personal information manager generating a host meeting reminder on the meeting host computer at the predetermined time before the time and date of the virtual meeting specified in the scheduled virtual meeting request;

means for the meeting participant's personal information manager application invoking the meeting participant virtual meeting utility at a second predetermined time before the time and date of the virtual meeting that is specified in the scheduled virtual meeting request, the participant virtual meeting utility being invoked to join the virtual meeting;

means for invoking the host virtual meeting utility only if the scheduled virtual meeting request specifies that the host virtual meeting utility should be started at the time the host meeting reminder is generated; and means for providing an option to join a virtual meeting specified in the host meeting reminder.

46. A system for scheduling a virtual meeting between a meeting host and at least one meeting participant, the system comprising:

a meeting host's computer having a host virtual meeting utility and a host personal information manager application, the host personal information manager application having a facility for creating and sending a scheduled virtual meeting request over a communication network to at least one meeting participant's computer;

means for sending the scheduled virtual meeting request from the meeting host's computer to each meeting participant's computer, the scheduled virtual meeting request specifying a date and time of a virtual meeting;

a meeting participant's personal information manager application on each meeting participant's computer, the meeting participant's personal information manager having a facility for receiving the scheduled virtual meeting request and storing the scheduled virtual meeting request until the date and time of the virtual meeting;

means for the host personal information manager program invoking the host virtual meeting utility at a first predetermined time before the time and date of the virtual meeting specified in the scheduled virtual meeting request, the host virtual meeting utility being invoked to host the virtual meeting;

means for the host personal information manager generating a host meeting reminder on the meeting host's computer at the predetermined time before the time and date of the virtual meeting specified in the scheduled virtual meeting request;

means for the meeting participant's personal information manager application invoking the meeting participant virtual meeting utility at a second predetermined time before the time and date of the virtual meeting that is specified in the scheduled virtual meeting request, the participant virtual meeting utility being invoked to join the virtual meeting;

means for invoking the host virtual meeting utility only if the scheduled virtual meeting request specifies that the host virtual meeting utility should be started at the time the host meeting reminder is generated; and means for automatically joining a virtual meeting specified in the host meeting reminder.

47. A system for scheduling a virtual meeting between a meeting host and at least one meeting participant, the system comprising:

a meeting host's computer having a host virtual meeting utility and a host personal information manager application, the host personal information manager application having a facility for creating and sending a scheduled virtual meeting request over a communication network to at least one meeting participant's computer;

means for sending the scheduled virtual meeting request from the meeting host's computer to each meeting participant's computer, the scheduled virtual meeting request specifying a date and time of a virtual meeting;

a meeting participant's personal information manager application on each meeting participant's computer, the meeting participant's personal information manager having a facility for receiving the scheduled virtual meeting request and storing the scheduled virtual meeting request until the date and time of the virtual meeting;

means for the host personal information manager program invoking the host virtual meeting utility at a first predetermined time before the time and date of the virtual meeting specified in the scheduled virtual meeting request, the host virtual meeting utility being invoked to host the virtual meeting;

means for the host personal information manager generating a host meeting reminder on the meeting host's computer at the predetermined time before the time and date of the virtual meeting specified in the scheduled virtual meeting request;

means for the meeting participant's personal information manager application invoking the meeting participant virtual meeting utility at a second predetermined time before the time and date of the virtual meeting that is specified in the scheduled virtual meeting request, the participant virtual meeting utility being invoked to join the virtual meeting;

means for generating a meeting participant meeting reminder on the meeting participant's computer at the predetermined time before the time and date of the virtual meeting specified in the scheduled virtual meeting request;

means for invoking the meeting participant virtual meeting utility only if the scheduled virtual meeting request specifies that the meeting participant virtual meeting utility should be started at the time the meeting participant meeting reminder is generated; and means for providing an option to join a virtual meeting specified in the participant meeting reminder.

48. A system for scheduling a virtual meeting between a meeting host and at least one meeting participant, the system comprising:

a meeting host's computer having a host virtual meeting utility and a host personal information manager application, the host personal information manager application having a facility for creating and sending a scheduled virtual meeting request over a communication network to at least one meeting participant's computer;

means for sending the scheduled virtual meeting request from the meeting host's computer to each meeting participant's computer, the scheduled virtual meeting request specifying a date and time of a virtual meeting;

a meeting participant's personal information manager application on each meeting participant's computer, the meeting participant's personal information manager having a facility for receiving the scheduled virtual meeting request and storing the scheduled virtual meeting request until the date and time of the virtual meeting;

the host personal information manager program invoking the host virtual meeting utility at a first predetermined time before the time and date of the virtual meeting specified in the scheduled virtual meeting request, the host virtual meeting utility being invoked to host the virtual meeting;

the host personal information manager generating a host meeting reminder on the meeting host's computer at the predetermined time before the time and date of the virtual meeting specified in the scheduled virtual meeting request;

the meeting participant's personal information manager application invoking the meeting participant virtual meeting utility at a second predetermined time before the time and date of the virtual meeting that is specified in the scheduled virtual meeting request, the participant virtual meeting utility being invoked to join the virtual meeting;

means for generating a meeting participant meeting reminder on the meeting participant's computer at the predetermined time before the time and date of the virtual meeting specified in the scheduled virtual meeting request;

means for invoking the meeting participant virtual meeting utility only if the scheduled virtual meeting request specifies that the meeting participant virtual meeting utility should be started at the time the meeting participant meeting reminder is generated; and means for automatically joining a virtual meeting specified in the participant meeting reminder.

* * * * *

UNITED STATES PATENT AND TRADEMARK OFFICE
CERTIFICATE OF CORRECTION

PATENT NO. : 6,363,352 B1
DATED : March 26, 2002
INVENTOR(S) : J.L. Dailey et al.

It is certified that error appears in the above-identified patent and that said Letters Patent is hereby corrected as shown below:

Title page,
Item [56], References Cited, OTHER PUBLICATIONS, "Dabnor, "CTI improves videoconferencing," Telemarking and Call Center Solutions, Jan. 1997, v15, n7, 3 pages.*" should read -- Dabnor, John, "CTI improves videoconferencing," *Telemarketing & Call Center Solutions*, vol. 15, No. 7, pp. 22-25 (Jan. 1997). * -- "Deixler, "Annual PBX roundup: new switch sales take off as PBXs acquire great new features," Teleconnect, Sep. 1994, v12, n9, 6 pages. *" should read -- Deixler, Lyle et al., "Annual PBX roundup: new switch sales take off as PBXs acquire great new features," *Teleconnect*, vol. 12, No. 9, pp. 90-95 (Sep. 1994).* -- "Snyder, "Mac groupware: a collabative effort," LAN Magazine, Mar. 1994, v9, n3, 10 pages.*" should read -- Snyder, Joel, "Mac groupware: a collaborative effort," *LAN Magazine*, vol. 9, No. 3, pp. 130-139 (Mar. 1994).* --

Item [57], ABSTRACT, "computers joins" should read -- computer joins --

Column 1,
Line 41, "member is" should read -- member are --
Line 44, "work group" should read -- workgroup --

Column 2,
Line 3, "work group" should read -- workgroup --
Line 4, "document ," should read -- document, --
Line 33, "most the" should read -- most of the --
Line 49, "meeting participant's to" should read -- meeting participants to --

Column 3,
Line 37, "meeting participant's" should read -- meeting participants' --
Lines 50 and 57, "lookup" should read -- look up --

Column 4,
Line 38, "participants computer" should read -- participant's computer --
Line 55, "illustrates" should read -- illustrate --
Line 58, "participants computer" should read -- participant's computer --
Line 61, "representation" should read -- representations --

Column 5,
Line 4, "EMBODIMENTS" should read -- EMBODIMENT --

Column 6,
Line 3, "Process," should read -- process, --
Line 22, "helps" should read -- help --

UNITED STATES PATENT AND TRADEMARK OFFICE
CERTIFICATE OF CORRECTION

PATENT NO.   : 6,363,352 B1
DATED        : March 26, 2002
INVENTOR(S)  : J.L. Dailey et al.

It is certified that error appears in the above-identified patent and that said Letters Patent is hereby corrected as shown below:

Column 6 cont'd,
Line 29, "CD ROM" should read -- CD-ROM --
Line 45, "(ROM)," should read -- (ROMs), --
Line 49, "RAM 25," should read -- RAM 125, --

Column 9,
Line 43, "pant's" should read -- pants' --

Column 10,
Line 8, "as meeting" should read -- as the meeting --
Lines 19-20, "comput-ers" should read -- comput-er's --
Line 24, "1004 A-C." should read -- 1004*a-c*. --
Line 26, "1006 A-D." should read -- 1006*a-d*. --
Line 62, "participant's computers" should read -- participants' computers --

Column 11,
Line 15, "1004 A-C" should read -- 1004*a-c* --

Column 13,
Line 13, "participants computers" should read -- participants' computers --
Line 18, "reoccurring meetings" should read -- reoccurring meeting --
Line 19, "selecting a the" should read -- selecting the --
Line 22, "on a reoccurring specified" should read -- on a reoccurring meeting specified --
Line 23, "when is selected." should read -- when this is selected. --
Line 42, "respectively)." should read -- respectively.) --
Line 48, "acceptance" should read -- accepted --

Column 14,
Line 42, "participants computer's" should read -- participants' computer's --
Line 43, "meeting. (FIG. 5;" should read -- meeting, (FIG. 5; --
Line 55, "time that is" should read -- time is --

Column 15,
Line 60, "1906B-D" should read -- 1906*b-d* --

Column 17,
Line 38, "protocol" should read -- Protocol --
Line 57, "document; and" should read -- document; --

UNITED STATES PATENT AND TRADEMARK OFFICE
CERTIFICATE OF CORRECTION

PATENT NO.     : 6,363,352 B1
DATED          : March 26, 2002
INVENTOR(S)    : J.L. Dailey et al.

It is certified that error appears in the above-identified patent and that said Letters Patent is hereby corrected as shown below:

Column 21,
Line 65, "ticipants" should read -- ticipant's --

Column 23,
Line 16, "specific" should read -- specified --
Line 20, "the host meeting" should read -- the meeting --

Column 24,
Line 31, "document; and" should read -- document; --

Column 27,
Line 53, begin a new subparagraph with the phrase "invoking the host virtual meeting utility…"

Column 30,
Line 59, "claim 33" should read -- claim 33, --

Column 31,
Line 18, "document; and" should read -- document; --

Column 32,
Line 47, "document; and" should read -- document; --

Column 33,
Line 43, delete the second occurrence of "means for"

Signed and Sealed this

Fifteenth Day of April, 2003

JAMES E. ROGAN
*Director of the United States Patent and Trademark Office*